US012781012B2

(12) United States Patent
Minami

(10) Patent No.: US 12,781,012 B2
(45) Date of Patent: Nov. 3, 2026

(54) POLY(3-HYDROXYALKANOATE)-BASED FOAM PARTICLES AND POLY(3-HYDROXYALKANOATE)-BASED FOAM MOLDED BODY

(71) Applicant: KANEKA CORPORATION, Osaka (JP)

(72) Inventor: Tetsuya Minami, Settsu (JP)

(73) Assignee: KANEKA CORPORATION, Osaka (JP)

( * ) Notice: Subject to any disclaimer, the term of this patent is extended or adjusted under 35 U.S.C. 154(b) by 580 days.

(21) Appl. No.: 18/557,541

(22) PCT Filed: Apr. 21, 2022

(86) PCT No.: PCT/JP2022/018379
§ 371 (c)(1),
(2) Date: Oct. 26, 2023

(87) PCT Pub. No.: WO2022/230746
PCT Pub. Date: Nov. 3, 2022

(65) Prior Publication Data

US 2024/0209172 A1 Jun. 27, 2024

(30) Foreign Application Priority Data

Apr. 28, 2021 (JP) ................................ 2021-076760

(51) Int. Cl.
*C08J 9/16* (2006.01)
*C08J 9/20* (2006.01)
*C08J 9/22* (2006.01)
*C08J 9/228* (2006.01)

(52) U.S. Cl.
CPC .......... *C08J 9/20* (2013.01); *C08J 2201/024* (2013.01); *C08J 2203/14* (2013.01); *C08J 2367/04* (2013.01); *C08J 2467/00* (2013.01)

(58) Field of Classification Search
CPC .... C08J 9/20; C08J 2201/024; C08J 2203/14; C08J 2367/04; C08J 2467/00; C08J 9/0061; C08J 9/122; C08J 9/18; C08J 9/232; C08J 9/16; Y02W 90/10
See application file for complete search history.

(56) References Cited

U.S. PATENT DOCUMENTS

| | | | | |
|---|---|---|---|---|
| 5,589,518 | A | 12/1996 | Bastioli et al. | |
| 2009/0197982 | A1* | 8/2009 | Miyagawa .......... | B29C 44/3461 521/60 |
| 2010/0184877 | A1* | 7/2010 | Miyagawa ............ | C08J 9/0061 264/109 |
| 2020/0255619 | A1 | 8/2020 | Takahashi et al. | |
| 2020/0354539 | A1 | 11/2020 | Minami | |
| 2023/0331951 | A1 | 10/2023 | Takahashi et al. | |

FOREIGN PATENT DOCUMENTS

| | | | |
|---|---|---|---|
| CN | 111548552 | A | 8/2020 |
| JP | 7-258453 | A | 10/1995 |
| JP | 8-302173 | A | 11/1996 |
| JP | 2010-229407 | A | 10/2010 |
| JP | 2012-82333 | A | 4/2012 |
| JP | 2012241166 | A * | 12/2012 |
| JP | 5383489 | B2 | 1/2014 |
| WO | WO 2014/136746 | A1 | 9/2014 |
| WO | WO 2019/146555 | A1 | 8/2019 |

OTHER PUBLICATIONS

Combined Chinese Office Action and Search Report issued Apr. 11, 2026 in Chinese Patent Application No. 202280030718.8 (with English translation), 13 pages.
International Search Report issued on Jun. 28, 2022 in PCT/JP2022/018379 (with English translation), 4 pages.
International Preliminary Report on Patentability and Written Opinion issued on Oct. 24, 2023 in PCT/JP2022/018379 (with English translation), 7 pages.
Japanese Notice of Reasons for Refusal issued Jan. 6, 2026 in Japanese Patent Application No. 2023-517475 with English Machine translation, 5 pgs.

* cited by examiner

*Primary Examiner* — K. Boyle
(74) *Attorney, Agent, or Firm* — Oblon, McClelland, Maier & Neustadt, L.L.P.

(57) ABSTRACT

An object of an embodiment of the present invention is to provide poly(3-hydroxyalkanoate)-based expanded particles and a poly(3-hydroxyalkanoate)-based foamed molded product both of which are obtained by a single expansion treatment and have a high expansion ratio. Provided are poly(3-hydroxyalkanoate)-based expanded particles and a poly(3-hydroxyalkanoate)-based foamed molded product both of which include a poly(3-hydroxyalkanoate) composition containing a non-ionic water-soluble polymer.

13 Claims, No Drawings

POLY(3-HYDROXYALKANOATE)-BASED FOAM PARTICLES AND POLY(3-HYDROXYALKANOATE)-BASED FOAM MOLDED BODY

CROSS-REFERENCE TO RELATED APPLICATIONS

The present application is a 35 U.S.C. § 371 national stage patent application of International patent application PCT/JP2022/018379, filed on Apr. 21, 2022, which is based on and claims the benefits of priority to Japanese Application No. 2021-076760, filed on Apr. 28, 2021. The entire contents of these applications are incorporated herein by reference.

TECHNICAL FIELD

An embodiment of the present invention relates to poly(3-hydroxyalkanoate)-based expanded particles and a poly(3-hydroxyalkanoate)-based foamed molded product.

BACKGROUND ART

Petroleum-derived plastics are disposed of in large quantities every year, and a shortage of landfill sites and environmental pollution due to these large quantities of waste are taken up as serious problems. In recent years, microplastics have been a major problem in a marine environment. Thus, biodegradable plastics degraded by the action of microorganisms (a) in the environment such as the sea and soil and (b) in landfill sites and compost have attracted attention.

Biodegradable plastics have been developed for a wide range of applications, including (a) agricultural, forestry, and fishery materials used in the environment and (b) food containers, packaging materials, sanitary materials, and garbage bags that are difficult to recycle and reuse after use. In addition, foamed products made from biodegradable plastic are expected to be used for, for example, cushioning materials for packaging, produce boxes, fish boxes, automotive components, building materials, and civil engineering materials.

Among the above-described biodegradable plastics, poly(3-hydroxyalkanoate) (hereinafter may be referred to as "P3HA") has attracted attention as a plastic derived from a plant material from the viewpoint of excellent biodegradability and carbon neutrality.

The development of techniques relating to biodegradable plastics has conventionally been pursued vigorously. For example, Patent Literature 1 discloses a resin composition obtained by mixing a specific proportion of polyalkylene oxide into an aliphatic polyester-based copolymer produced from a microorganism. More specifically, it is disclosed in Patent Literature 1 that a biodegradable resin with a low glass transition point and high toughness at a low temperature can be obtained by mixing a specific proportion of polyalkylene oxide into an aliphatic polyester-based copolymer produced from a microorganism.

Patent Literature 2 discloses (i) non-crosslinked pre-expanded particles that are obtained by expanding particles formed of a resin composition which is mainly composed of a poly(3-hydroxyalkanoate)-based resin having biodegradability and (ii) an in-mold foamed molded product using the pre-expanded particles. More specifically, it is disclosed in Patent Literature 2 that non-crosslinked poly(3-hydroxyalkanoate)-based pre-expanded particles with a high expansion ratio and a high closed cell ratio and an in-mold foamed molded product with a high expansion ratio and a high closed cell ratio can be obtained by, under a specific condition, expanding particles formed of a resin composition including a poly(3-hydroxyalkanoate)-based resin and a specific glycerin triester.

Patent Literature 3 discloses an aliphatic polyester foamed product and aliphatic polyester porous particles both of which have a uniform porous structure, and production methods for them. More specifically, it has been disclosed in Patent Literature 3 that aliphatic polyester is expanded in the presence of polyol to obtain an aliphatic polyester foamed product or an aliphatic polyester porous particles both of which have a desired expansion ratio, a high porosity, a small pore diameter variation, and biodegradability.

CITATION LIST

Patent Literature

Patent Literature 1

Japanese Patent Application Publication Tokukai No. 2010-229407

Patent Literature 2

Japanese Patent Application Publication Tokukai No. 2012-241166

Patent Literature 3

International Publication No. WO 2014/136746

SUMMARY OF INVENTION

Technical Problem

However, the conventional techniques as described above cannot be said to allow poly(3-hydroxyalkanoate)-based expanded particles obtained by a single expansion treatment to have a sufficiently high expansion ratio, and thus have room for improvement in terms of an expansion ratio.

In consideration of these circumstances, an object of an embodiment of the present invention is to provide poly(3-hydroxyalkanoate)-based expanded particles and a poly(3-hydroxyalkanoate)-based foamed molded product both of which achieve a high expansion ratio by a single expansion treatment.

Solution to Problem

That is, poly(3-hydroxyalkanoate)-based expanded particles includes:

a poly(3-hydroxyalkanoate)-based resin (A); and a non-ionic water-soluble polymer (B), the poly(3-hydroxyalkanoate)-based expanded particles containing the non-ionic water-soluble polymer (B) in an amount of 0.10 parts by weight to 5.00 parts by weight with respect to 100 parts by weight of the poly(3-hydroxyalkanoate)-based resin (A), the poly(3-hydroxyalkanoate)-based expanded particles having a closed cell ratio of not less than 90%.

Advantageous Effects of Invention

According to an embodiment of the present invention, it is possible to provide poly(3-hydroxyalkanoate)-based expanded particles and a poly(3-hydroxyalkanoate)-based foamed molded product both of which are obtained by a single expansion treatment and have a high expansion ratio.

DESCRIPTION OF EMBODIMENTS

The following description will discuss embodiments of the present invention. The present invention is not, however, limited to these embodiments. The present invention is not limited to the configurations described below, but may be altered in various ways within the scope of the claims. The present invention also encompasses, in its technical scope, any embodiment or example derived by combining technical means disclosed in differing embodiments and Examples. Further, it is possible to form a new technical feature by combining the technical means disclosed in the respective embodiments. All academic and patent documents cited in the present specification are incorporated herein by reference. Any numerical range expressed as “A to B” in the present specification means “not less than A and not more than B (i.e., a range from A to B which includes both A and B)” unless otherwise stated.

1. Technical Idea of an Embodiment of the Present Invention

In Patent Literature 1, there is no description on the effect of polyalkylene oxide on the expansion ratio of expanded particles when the resin composition obtained by mixing the polyalkylene oxide into an aliphatic polyester-based copolymer is made into the expanded particles. Note that, in the technique described in Patent Literature 1, Example in which the polyalkylene oxide was used in an amount of not less than 5.26 parts by weight with respect to 100 parts by weight of the aliphatic polyester-based copolymer is disclosed. However, it is preferable to minimize sub-components other than resin, and there is room for improvement in this regard.

The technique described in Patent Literature 2 is a technique relating to non-crosslinked expanded particles. Patent Literature 2 discloses achievement of an increase in expansion ratio with the use of a large amount of a specific glycerin triester or with the use of a poly(3-hydroxybutyrate-co-3-hydroxyhexanoate) copolymer (PHBH) having a high MFR and a small amount of glycerin triester. However, it is preferable to minimize sub-components other than resin, and there is room for improvement in this regard. Further, the use of PHBH having a high MFR results in poor moldability and a narrow process window, and there is room for improvement in this regard. In addition, in the technique described in Patent Literature 2, a plasticizer is used. In this case, the strength of the foamed molded product is decreased, and there is also room for improvement in this regard.

The inventor of the present invention found, through his own study, that, with the technique described in Patent Literature 3, the resulting aliphatic polyester expanded product or porous particles has/have low porosity of closed pores and cannot be employed for secondary processing such as in-mold foamed molding.

As a result of diligent study, the inventor and others of the present invention completed the present invention by finding that poly(3-hydroxyalkanoate)-based expanded particles containing a specific amount of non-ionic water-soluble polymer do not necessarily require a second expansion treatment because the poly(3-hydroxyalkanoate)-based expanded particles obtained by a single expansion treatment have a high expansion ratio. Note that, if the second expansion treatment is not necessary, there is a great advantage of not only achieving a simplification of a production process for expanded particles, but also achieving a reduction in production cost of expanded particles.

2. Poly(3-Hydroxyalkanoate)-Based Expanded Particles

In the present specification, “poly(3-hydroxyalkanoate)-based expanded particles” may be referred to as “expanded particles”, “poly(3-hydroxyalkanoate)-based expanded particles in accordance with an embodiment of the present invention” may be referred to as “present expanded particles”, a “poly(3-hydroxyalkanoate)-based foamed molded product” may be referred to as a “foamed molded product”, and a “poly(3-in hydroxyalkanoate)-based foamed molded product accordance with an embodiment of the present invention” may be referred to as a “present foamed molded product”.

The present expanded particles are expanded particles obtained by expanding the poly(3-hydroxyalkanoate)-based resin particles made of a poly(3-hydroxyalkanoate)-based resin composition. In the present specification, the “poly(3-hydroxyalkanoate)-based resin composition” may be referred to as a “resin composition”, and the “poly(3-hydroxyalkanoate)-based resin particles” may be referred to as “resin particles”.

In the present specification, a repeating unit derived from an X monomer may be referred to as an “X unit”. A repeating unit can also be described as a structural unit.

Poly(3-hydroxyalkanoate)-based expanded particles in accordance with an embodiment of the present invention contain a poly(3-hydroxyalkanoate)-based resin (A) and a non-ionic water-soluble polymer (B). The non-ionic water-soluble polymer (B) is contained in an amount of 0.10 parts by weight to 5.00 parts by weight with respect to 100 parts by weight of the poly(3-hydroxyalkanoate)-based resin (A), and the poly(3-hydroxyalkanoate)-based expanded particles have a closed cell ratio of not less than 90%.

The present expanded particles have the above-described configuration and thus have an advantage in that a high expansion ratio can be achieved. The present foamed molded product can be produced by molding the present expanded particles by a known method.

(2-1. Poly(3-Hydroxyalkanoate)-Based Resin (A))

The poly(3-hydroxyalkanoate)-based expanded particles in accordance with an embodiment of the present invention include a poly(3-hydroxyalkanoate)-based resin (A) as a component. In the present specification, the “poly(3-hydroxyalkanoate)-based resin (A)” may be referred to as “poly(3-hydroxyalkanoate)” or “P3HA”. This component will be described below.

The P3HA is a polymer having a 3-hydroxyalkanoate unit as an essential structural unit (monomer unit). In the present specification, “3-hydroxyalkanoate” may be referred to as “3HA”. Specifically, the P3HA is preferably a polymer including a repeating unit represented by the following general formula (1):

$$[—CHR—CH_2—CO—O—] \quad (1)$$

In general Formula (1), R represents an alkyl group expressed by $C_nH_{2n+1}$, and n represents an integer of 1 to 15.

Examples of R include linear or branched alkyl groups such as a methyl group, an ethyl group, a propyl group, an isopropyl group, a butyl group, an isobutyl group, a t-butyl group, a pentyl group, and a hexyl group. n is preferably 1 to 10, and more preferably 1 to 8.

As the P3HA, P3HA produced from a microorganism, in particular, is preferable. The P3HA produced from a microorganism is poly[(R)-3HA] in which 3HA units are all (R)-3HA.

The P3HA includes preferably not less than 50 mol % of 3HA units (in particular, the repeating unit of general formula (1)), more preferably not less than 70 mol % of 3HA units, and even more preferably not less than 80 mol % of 3HA units in 100 mol % of all repeating units of the P3HA. The repeating units (monomer units) may be 3HA units only or may include, in addition to the 3HA unit, a repeating unit derived from a monomer other than 3HA (e.g., a 4-hydroxyalkanoate unit and the like).

Specific examples of the 3HA units include a 3-hydroxybutyrate unit, a 3-hydroxyvalerate unit, and a 3-hydroxyhexanoate unit. 3-hydroxybutyrate is close to propylene in terms of a melting point and tensile strength. Therefore, the P3HA in accordance with an embodiment of the present invention preferably includes a 3-hydroxybutyrate unit. In the present specification, "3-hydroxybutyrate" may be referred to as "3HB".

In a case where the P3HA contains two or more repeating units, the monomer that is derived from a repeating unit other than a repeating unit contained in the highest amount in P3HA is referred to as a comonomer. In the present specification, a "repeating unit derived from a comonomer" may be referred to as a "comonomer unit".

The comonomer is not particularly limited, and is preferably 3-hydroxyhexanoate (hereinafter may be referred to as 3HH), 4-hydroxybutyrate (hereinafter may be referred to as 4HB), and the like.

The P3HA is preferably one or more substances selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate). Among these, poly(3-hydroxybutyrate-co-3-hydroxyhexanoate) and poly(3-hydroxybutyrate-co-4-hydroxybutyrate) are more preferable from the viewpoint of, for example, processability and physical properties of a foamed molded product.

The P3HA preferably has a 3HB unit as an essential repeating unit (structural unit) and has a comonomer unit. That is, the P3HA is preferably a copolymer having a 3HB unit and a comonomer unit.

More specifically, the P3HA is a copolymer having a 3-hydroxybutyrate unit and a comonomer unit, and the ratio of the 3HB unit to the comonomer unit (the 3HB unit/the comonomer unit) in 100 mol % of all repeating units in the copolymer is preferably 99/1 (mol %/mol %) to 85/15 (mol %/mol %). The ratio of the 3HB unit to the comonomer unit (the 3HB unit/the comonomer unit) in 100 mol % of all repeating units in the copolymer is more preferably 97/3 (mol %/mol %) to 87/13 (mol %/mol %) and even more preferably 95/5 (mol %/mol %) to 89/11 (mol %/mol %) from the viewpoint of achieving a higher expansion ratio.

The P3HA having the monomeric units in such a ratio can be prepared in accordance with a method known to a person skilled in the art, which is, for example, the method described in International Publication No. WO 2009/145164. The ratio of the monomeric units in the P3HA can be determined by a method known to a person skilled in the art, which is, for example, the method described in International Publication No. WO 2013/147139.

In an embodiment of the present invention, a method for producing P3HA is not particularly limited, and may be a production method using chemical synthesis or may be a production method using a microorganism. Among these methods, a production method using a microorganism is preferable. For a P3HA production method using a microorganism, a known method can be employed, and preferably includes a culture process, a purification process, and a drying process.

A method for culturing a microorganism that produces P3HA in the culture process is not particularly limited, and, for example, the method described in International Publication No. WO 2019/142717 can be used.

Specific examples of a bacterium that produces a copolymer of 3HB and another hydroxyalkanoate include *Aeromonas caviae*, which is a bacterium capable of producing P3HB3HV and P3HB3HH, and *Alcaligenes eutrophus*, which is a bacterium capable of producing P3HB4HB. In particular, regarding P3HB3HH, for example, an *Alcaligenes eutrophus* AC32 strain (*Alcaligenes eutrophus* AC32, FERM BP-6038 (T. Fukui, Y. Doi, J. Bateriol., 179, p. 4821-4830 (1997)) into which genes of a group of P3HA synthases have been introduced to increase productivity of P3HB3HH is more preferable. In a method for producing P3HA, microorganism bacterial cells obtained by culturing microorganisms, such as an *Alcaligenes eutrophus* AC32 strain, under appropriate conditions and accumulating P3HB3HH in bacterial cells of the microorganisms are suitably used. Regarding the copolymer-producing bacterium, besides the above, a genetically modified microorganism into which various P3HA synthesis-related genes have been introduced may be used in accordance with P3HA that is desired to be produced. In addition, regarding culture conditions for a microorganism (bacterium), various culture conditions including a type of substrate may be optimized in accordance with P3HA that is desired to be produced.

A method for purifying P3HA obtained by microbial culture in the purification process is not particularly limited, and a known physical treatment, and/or a known chemical treatment, and/or a known biological treatment may be employed. For example, a purification method described in International Publication No. WO 2010/067543 may be preferably employed.

A method for subjecting the P3HA obtained by microbial culture and purification to drying in the drying process is not particularly limited, and spray drying, fluidized bed drying, flash drying, rotational drying, vibrational drying, and band drying can be employed. For example, a drying method described in International Publication No. WO 2018/070492 may be preferably employed.

The drying process may include:

(a) a step of preparing an aqueous suspension A containing 100 parts by weight of P3HA and 0.10 parts by weight to 5.00 parts by weight of non-ionic water-soluble polymer which will be described below; and (b) a step of spray-drying the aqueous suspension A having been prepared in the step (a).

The inclusion of the steps (a) and (b) yields P3HA containing 0.10 parts by weight to 5.00 parts by weight of a non-ionic water-soluble polymer with respect to 100 parts by weight of P3HA.

In the step (b) in the method for producing P3HA of the present invention, the aqueous suspension A having been prepared in the step (a) is spray-dried. Examples of a spray-drying method include a method in which the aqueous suspension A in a state of fine droplets is supplied into a dryer and dried in contact with hot air in the dryer. A method (atomizer) of supplying the aqueous suspension A in a state of fine droplets into a dryer is not particularly limited, and can be a known method such as a method using a rotary disc or a method using a nozzle. A manner of contact between the droplets and the hot air in the dryer is not particularly limited. For example, the droplets and the hot air can be brought in contact with each other in a co-current manner, a countercurrent manner, or in a manner combining a co-current manner and a countercurrent manner.

A drying temperature in spray-drying of the step (b) may be any temperature at which most of the aqueous medium can be removed from the droplets of the aqueous suspension A. The drying temperature can be set as appropriate, provided that the aqueous solution A can be dried until a desired moisture content is achieved and that a deterioration in quality (a decrease in molecular weight and a reduction in color tone) and melting are minimized. In addition, a volume of hot air in the dryer can be set as appropriate, for example, in accordance with a size of the dryer and the like.

The method for producing P3HA in accordance with an embodiment of the present invention may include, after the step (b), a step of further drying resulting P3HA. The method for producing P3HA in accordance with an embodiment of the present invention may include other step(s) (for example, a step of adding various additives to the aqueous suspension A, or the like).

The method for producing P3HA in accordance with an embodiment of the present invention makes it possible to obtain P3HA in a dry state with high productivity and excellent thermal stability. In particular, the method for producing P3HA in accordance with an embodiment of the present invention makes it possible to reduce cost (facility cost and utilities) of the drying process. Further, the method for producing P3HA in accordance with an embodiment of the present invention makes it possible to obtain P3HA in a powder (P3HA powder) state, and thus makes it possible to highly efficiently obtain P3HA with excellent handleability.

(2-2. Non-Ionic Water-Soluble Polymer (B))

Poly(3-hydroxyalkanoate)-based expanded particles in accordance with an embodiment of the present invention include a non-ionic water-soluble polymer (B) as a component. This component will be described below.

The non-ionic water-soluble polymer (B) in the present invention is a polymer that does not ionize to ions when dissolved in water.

The amount of the non-ionic water-soluble polymer (B) contained in the present expanded particles is 0.10 parts by weight to 5.00 parts by weight, preferably 0.10 parts by weight to 4.00 parts by weight, more preferably 0.10 parts by weight to 3.00 parts by weight, even more preferably 0.10 parts by weight to 2.00 parts by weight, and still more preferably 0.10 parts by weight to 1.50 parts by weight, with respect to 100 parts by weight of the P3HA described above. In all of these numerical ranges, the lower limit is not limited to 0.10, and may be 0.20, 0.30, 0.40, 0.50, 0.60, 0.70, 0.80, 0.90, or 1.00. This configuration makes it possible to increase the expansion ratio of poly(3-hydroxyalkanoate)-based expanded particles obtained by a single expansion treatment. In addition, this configuration makes it possible to reduce the amount of the non-ionic water-soluble polymer (B) contained in the poly(3-hydroxyalkanoate)-based expanded particles. As a result, it is possible to prevent various effects of the non-ionic water-soluble polymer (B) on the poly(3-hydroxyalkanoate)-based expanded particles.

A method for quantifying the amount of the non-ionic water-soluble polymer (B) contained in the expanded particles is not particularly limited. The amount of the non-ionic water-soluble polymer (B) contained in the expanded particles can be analyzed by an analytical institution or the like. The amount of the non-ionic water-soluble polymer (B) contained in the expanded particles can be measured by a method including, for example, the following (1) to (4): (1) Dissolve 20 mg of expanded particles in 0.8 ml of deuterated chloroform. (2) Further add 20 mg of 1,1,2,2-tetrachloroethane as an internal standard to the deuterated chloroform solution prepared in (1) above. (3) For each of the following deuterated chloroform solutions: (a) a deuterated chloroform solution prepared by dissolving any amount (e.g., 10 mg) of non-ionic water-soluble polymer (B) (preparation) and 20 mg of 1,1,2,2-tetrachloroethane in 0.8 ml of deuterated chloroform; and (b) the deuterated chloroform solution prepared in (2) above, measure the NMR spectra derived from the non-ionic water-soluble polymer (B) contained in these deuterated chloroform solutions through 1H-NMR. (4) With reference to the results of measurement of the deuterated chloroform solution containing the non-ionic water-soluble polymer (B) (preparation), quantify the amount of the non-ionic water-soluble polymer (B) in the expanded particles on the basis of a signal intensity ratio which is calculated from both of the NMR spectra and derived from the non-ionic water-soluble polymer (B). This method may be referred to as a two liquid method.

Note that expanded particles obtained using a crosslinking agent (expanded particles which can have a partially cross-linked structure) may not be completely dissolved in an organic solvent. The expanded particles obtained using a crosslinking agent are also referred to as “expanded particles X”. Regarding the amount of the non-ionic water-soluble polymer (B) contained in the expanded particles X, when expanded particles obtained under the conditions precisely identical to the conditions in the method for producing the expanded particles X except that no crosslinking agent is used (hereinafter may also be referred to as “expanded particles Y”) are used as a sample, the amount of the non-ionic water-soluble polymer (B) contained in the expanded particles Y obtained through the measurement by the above-described two liquid method is regarded as the amount of the non-ionic water-soluble polymer (B) contained in the expanded particles X.

The non-ionic water-soluble polymer (B) has a hydrophilic group. The non-ionic water-soluble polymer (B) preferably further includes a hydrophobic group. Since the non-ionic water-soluble polymer (B) has a hydrophilic group, the non-ionic water-soluble polymer (B) has an advantage of making it possible to increase the expansion ratio. On the other hand, the non-ionic water-soluble polymer (B) having a hydrophobic group has an advantage of making it possible to inhibit bleeding from resin particles and expanded particles. This configuration is preferable from the viewpoint of improving the expansion ratio and compatibility with P3HA.

The hydrophilic group is not limited, and examples of the hydrophilic group can include an oxyethylene group, a hydroxy group, a carboxy group, and an ether group. Among these, an oxyethylene group and a hydroxy group are preferable from the viewpoint of easily balancing hydrophilicity and hydrophobicity. The hydrophobic group is not limited, and examples of the hydrophobic group can include a linear alkyl group, a branched alkyl group, an oxypropylene group, a fluoroalkyl group, and an alkylsiloxane group. Among these, a linear alkyl group, a branched alkyl group, and an oxypropylene group are preferable from the viewpoint of easily balancing hydrophilicity and hydrophobicity.

The non-ionic water-soluble polymer (B) is exemplified by a combination of a hydrophilic block and a hydrophobic block, a combination of a hydrophilic main chain and a hydrophobic side chain, and a combination of a hydrophobic main chain and a hydrophilic side chain.

The non-ionic water-soluble polymer (B) is preferably a biodegradable substance. Such a configuration is preferable because resulting P3HA-based expanded particles and P3HA-based foamed molded product have biodegradability. Note that the biodegradable substance is a substance having biodegradability according to OECD TG301.

The biodegradable non-ionic water-soluble polymer (B) is not limited, and can be exemplified by a natural polymer, a semi-synthetic polymer, and a synthetic polymer. Specific examples of the natural polymer include starch, guar gum, and carrageenan xanthan gum. Examples of the semi-synthetic polymer include a cellulose derivative and a starch derivative. Examples of the synthetic polymer include polyalkylene oxide, polyvinyl alcohol, polyacrylamide, polyvinyl pyrrolidone, and poly-N-vinyl acetamide. Among these, a starch derivative, a cellulose derivative, polyvinyl alcohol, and polyalkylene oxide are preferable from the viewpoint of easily balancing hydrophilicity and hydrophobicity.

The non-ionic water-soluble polymer (B) is preferably at least one selected from the group consisting of polyalkylene oxide, polyvinyl alcohol, and a cellulose derivative. At this time, it is preferable that the non-ionic water-soluble polymer (B) be contained in an amount of 0.10 parts by weight to 1.00 part by weight with respect to 100 parts by weight of P3HA. Note that, in this numerical range, the lower limit is not limited to 0.10, and may be 0.20, 0.30, 0.40, 0.50, 0.60, 0.70, 0.80, or 0.90. This configuration makes it possible to further increase the expansion ratio of poly(3-hydroxyalkanoate)-based expanded particles obtained by a single expansion treatment. In addition, this configuration makes it possible to further reduce the amount of the non-ionic water-soluble polymer (B) contained in the poly(3-hydroxyalkanoate)-based expanded particles. As a result, it is possible to further prevent various effects of the non-ionic water-soluble polymer (B) on the poly(3-hydroxyalkanoate)-based expanded particles.

The polyalkylene oxide is not particularly limited, and, for example, a commercially available polyalkylene oxide can be used. Examples of the commercially available polyalkylene oxide include Pluronic 10400 (manufactured by BASF), Pluronic 10500 (manufactured by BASF), Genapol PF80 (manufactured by CLARIANT), Unilube DP60-600B (manufactured by NOF CORPORATION), Unilube DP60-950B (manufactured by NOF CORPORATION), Plonon 208 (manufactured by NOF CORPORATION), Epan U105 (manufactured by Dai-ichi Kogyo Seiyaku Co., Ltd.), Epan U108 (manufactured by Dai-ichi Kogyo Seiyaku Co., Ltd.), Epan 750 (manufactured by Dai-ichi Kogyo Seiyaku Co., Ltd.), Emulsogen EPN 287 (manufactured by CLARIANT), Emulsogen LCN 407 (manufactured by CLARIANT), NOIGEN TDS (manufactured by Dai-ichi Kogyo Seiyaku Co., Ltd.), DKS NL (manufactured by Dai-ichi Kogyo Seiyaku Co., Ltd.), and NOIGEN SD (manufactured by Dai-ichi Kogyo Seiyaku Co., Ltd.).

The polyvinyl alcohol is not particularly limited, and, for example, a commercially available polyvinyl alcohol can be used. Examples of the commercially available polyvinyl alcohol include Kuraray Poval PVA-205 (manufactured by Kuraray Co., Ltd.), Kuraray Poval PVA-217 (manufactured by Kuraray Co., Ltd.), Kuraray Poval PVA-224 (manufactured by Kuraray Co., Ltd.), Exceval RS-1713 (manufactured by Kuraray Co., Ltd.), Exceval RS-1717 (manufactured by Kuraray Co., Ltd.), Gohsenol GH-22 (manufactured by Mitsubishi Chemical Corporation), Gohsenol GH-20R (manufactured by Mitsubishi Chemical Corporation), Gohsenol GH-17R (manufactured by Mitsubishi Chemical Corporation), Gohsenol GM-14R (manufactured by Mitsubishi Chemical Corporation), Gohsenol GL-05 (manufactured by Mitsubishi Chemical Corporation), Gohsenol GL-03 (manufactured by Mitsubishi Chemical Corporation), Gohsenol KH-20 (manufactured by Mitsubishi Chemical Corporation), Gohsenol KH-17 (manufactured by Mitsubishi Chemical Corporation), Gohsenol KL-05 (manufactured by Mitsubishi Chemical Corporation), Gohsenol KL-03 (manufactured by Mitsubishi Chemical Corporation), and Gohsenol NK-05R (manufactured by Mitsubishi Chemical Corporation).

The cellulose derivative is not particularly limited, and, for example, a commercially available cellulose derivative can be used. Examples of the commercially available cellulose derivative include Metolose MCE-100 (manufactured by Shin-Etsu Chemical Co., Ltd.), Metolose MCE-400 (manufactured by Shin-Etsu Chemical Co., Ltd.), Metolose MCE-4000 (manufactured by Shin-Etsu Chemical Co., Ltd.), Metolose SFE-400 (manufactured by Shin-Etsu Chemical Co., Ltd.), Metolose SFE-4000 (manufactured by Shin-Etsu Chemical Co., Ltd.), Metolose SE-50 (manufactured by Shin-Etsu Chemical Co., Ltd.), and Metolose NE-100 (manufactured by Shin-Etsu Chemical Co., Ltd.).

2-3. Additives

The present expanded particles may further include additives (other additives) other than the poly(3-hydroxyalkanoate)-based resin (A) and the non-ionic water-soluble polymer (B). As the other additives, for example, crystal nucleating agents, cell adjusting agents, lubricants, plasticizers, antistatic agents, flame retardants, electrically conductive agents, heat insulating agents, crosslinking agents, antioxidants, ultraviolet ray absorbing agents, coloring agents, inorganic fillers, organic fillers, hydrolysis inhibitors, and the like can be used according to the purpose. As the other additives, additives having biodegradability, in particular, are preferable.

Examples of the crystal nucleating agents include pentaerythritol, orotic acid, aspartame, cyanuric acid, glycine, zinc phenylphosphonate, and boron nitride. One of these crystal nucleating agents may be used alone, or two or more thereof may be used in admixture. When two or more crystal nucleating agents are used in admixture, a mixing ratio may be adjusted as appropriate according to the purpose.

The amount of the crystal nucleating agent(s) contained in the expanded particles is not particularly limited. For example, the crystal nucleating agent(s) is contained in an amount of preferably not more than 5.0 parts by weight, more preferably not more than 3.0 parts by weight, and even more preferably not more than 1.5 parts by weight, with respect to 100 parts by weight of the poly(3-hydroxyalkanoate)-based resin (A). The lower limit of the amount of the crystal nucleating agent(s) contained in the poly(3-hydroxyalkanoate)-based resin (A) is not particularly limited, and can be, for example, not less than 0.1 parts by weight, with respect to 100 parts by weight of the poly(3-hydroxyalkanoate)-based resin (A).

Examples of the cell adjusting agents include talc, silica, calcium silicate, calcium carbonate, aluminum oxide, titanium oxide, diatomaceous earth, clay, sodium bicarbonate, alumina, barium sulfate, aluminum oxide, and bentonite. Among these cell adjusting agents, talc is preferable in that talc is particularly excellent in dispersibility to P3HA. One of these cell adjusting agents may be used alone, or two or more thereof may be used in admixture. In a case where two or more cell adjusting agents are used in admixture, a mixing ratio may be adjusted as appropriate according to the purpose.

The amount of the cell adjusting agent(s) contained in the present expanded particles is not particularly limited, and is preferably 0.01 parts by weight to 1.00 part by weight, more preferably 0.03 parts by weight to 0.50 parts by weight, and even more preferably 0.05 parts by weight to 0.30 parts by weight, with respect to 100 parts by weight of the poly(3-hydroxyalkanoate)-based resin (A).

Examples of the plasticizers include: glycerin ester-based compounds such as glycerin diacetomonolaurate; citric ester-based compounds such as tributyl acetylcitrate; sebacic ester-based compounds such as dibutyl sebacate; adipic ester-based compounds; polyether ester-based compounds; benzoic ester-based compounds; phthalic ester-based compounds; isosorbide ester-based compounds; polycaprolactone-based compounds; and dibasic ester-based compounds such as benzyl methyl diethylene glycol adipate. Among these, glycerin ester-based compounds, citric ester-based compounds, sebacic ester-based compounds, and dibasic acid ester-based compounds are preferable in that the plasticization effect of P3HA is excellent. One of these plasticizers may be used alone, or two or more thereof may be used in admixture. In a case where two or more plasticizers are used in admixture, a mixing ratio may be adjusted as appropriate according to the purpose.

The amount of the plasticizer(s) contained in the present expanded particles is not particularly limited, and is preferably 1 part by weight to 20 parts by weight, more preferably 2 parts by weight to 15 parts by weight, and even more preferably 3 parts by weight to 10 parts by weight, with respect to 100 parts by weight of the poly(3-hydroxyalkanoate)-based resin (A).

The present expanded particles may contain a compound having an isocyanate group (hereinafter may be referred to as an isocyanate compound). Note, however, that the isocyanate compound may be toxic. In addition, in a case where the expanded particles contain the isocyanate compound, resulting expanded particles and foamed molded product may become yellow.

Thus, the amount of the isocyanate compound contained in the present expanded particles is preferably less than 3.0 parts by weight, more preferably less than 1.0 part by weight, and even more preferably less than 0.1 parts by weight, with respect to 100 parts by weight of the poly(3-hydroxyalkanoate)-based resin (A). Most preferably, the present expanded particles do not contain the isocyanate compound.

For example, a polyisocyanate compound having two or more isocyanate groups in one molecule can be used as the isocyanate compound. Examples of specific types of the isocyanate compound include an aromatic isocyanate compound, an alicyclic isocyanate compound, and an aliphatic isocyanate compound. For example, the (a) aromatic isocyanate compound is exemplified by an isocyanate compound having, as a skeleton, tolylene, diphenylmethane, naphthylene, tolidine, xylene, and/or triphenylmethane. The (b) alicyclic isocyanate compound is exemplified by an isocyanate compound having, as a skeleton, isophorone and/or hydrogenated diphenylmethane. Examples of the (c) aliphatic isocyanate compound include an isocyanate compound having, as a skeleton, hexamethylene and/or lysine. Furthermore, a mixture obtained by combining two or more of these isocyanate compounds can also be used. In a case where the isocyanate compound is used, it is preferable to use an isocyanate compound having, as a skeleton, tolylene and/or diphenylmethane, in particular, an isocyanate compound (polyisocyanate) having diphenylmethane as a skeleton, because of their versatility, handleability, weatherability, and the like.

Examples of the lubricant include behenic acid amide, oleic acid amide, erucic acid amide, stearic acid amide, palmitic acid amide, N-stearylbehenic acid amide, N-stearylerucic acid amide, ethylenebisstearic acid amide, ethylenebisoleic acid amide, ethylenebiserucic acid amide, ethylenebislauryl acid amide, ethylenebiscapric acid amide, p-phenylenebisstearic acid amide, and a polycondensate of ethylenediamine, stearic acid, and sebacic acid. Among these lubricants, behenic acid amide and erucic acid amide are preferable in that the lubricant effect on P3HA is particularly excellent. The amount of the lubricant used is not particularly limited, and is preferably 0.01 parts by weight to 5.00 parts by weight, more preferably 0.05 parts by weight to 3.00 parts by weight, and even more preferably 0.10 parts by weight to 1.50 parts by weight, with respect to 100 parts by weight of P3HA. In addition, the lubricant is not limited to one of the lubricants and may be a mixture of two or more of the lubricants, and a mixing ratio can be adjusted as appropriate according to the purpose.

Examples of the antistatic agent include coconut oil fatty acid diethanolamide. The amount of the antistatic agent contained in the present expanded particles is not particularly limited.

(2-4. Physical Properties of Poly(3-Hydroxyalkanoate)-Based Expanded Particles)

(Apparent Density)

The apparent density of the present expanded particles is not limited, and is preferably 20 g/L to 67 g/L, more preferably 25 g/L to 65 g/L, and even more preferably 30 g/L to 63 g/L. According to this configuration, it is possible to obtain a poly(3-hydroxyalkanoate)-based foamed molded product that balances mechanical strength and lightness. Note that measurement of the apparent density is carried out in accordance with the measurement method described in the Examples which will be described later.

(Expansion Ratio)

The expansion ratio of the present expanded particles is not limited, and is preferably not less than 18 times, more preferably not less than 19 times, more preferably not less than 20 times, more preferably not less than 21 times, more preferably not less than 22 times, and even more preferably not less than 23 times. The upper limit of the present expanded particles is not limited, and can be, for example, 50 times, 40 times, 30 times, 25 times, or 23 times. According to this configuration, it is possible to obtain a poly(3-hydroxyalkanoate)-based foamed molded product that balances mechanical strength and lightness. Note that measurement of the expansion ratio is carried out in accordance with the measurement method described in the Examples which will be described later.

(High Temperature-Side Heat Quantity)

The high temperature-side heat quantity of the present expanded particles is not limited, and is preferably 0.1 J/g to 20.0 J/g, more preferably 0.3 J/g to 18.0 J/g, and even more preferably 0.5 J/g to 15.0 J/g. This configuration makes it possible to eliminate adhesion of the poly(3-hydroxyalkanoate)-based expanded particles obtained in the expansion process to each other and makes it possible to provide poly(3-hydroxyalkanoate)-based expanded particles having excellent in-mold foam moldability. Note that measurement of the high temperature-side heat quantity is carried out in accordance with the measurement method described in the Examples which will be described later.

(Cell Diameter)

The cell diameter of the present expanded particles is not limited, and is preferably 50 μm to 500 μm, more preferably 100 μm to 450 μm, more preferably 150 μm to 400 μm, more preferably 200 μm to 350 μm, more preferably 220 μm to 300 μm, even more preferably 240 μm to 280 μm, and particularly preferably 245 μm to 270 μm. This configuration makes it possible to provide poly(3-hydroxyalkanoate)-based expanded particles having excellent in-mold foam moldability. Note that measurement of the cell diameter is carried out in accordance with the measurement method described in the Examples which will be described later.

(Gel Fraction)

The gel fraction of the present expanded particles is not limited, and is preferably not less than 30% by weight, more preferably not less than 40% by weight, and more preferably not less than 50% by weight. The upper limit of the gel fraction of the present expanded particles is not limited, and can be, for example, 90% by weight, 80% by weight, or 75% by weight. This configuration has an advantage of, when in-mold foam molding is carried out, widening a process window that can provide a good foamed molded product. Note that measurement of the gel fraction is carried out in accordance with the measurement method described in the Examples which will be described later.

(Closed Cell Ratio)

The closed cell ratio of the present expanded particles is not less than 90%, and is more preferably not less than 91%, more preferably not less than 92%, more preferably not less than 93%, more preferably not less than 94%, more preferably not less than 95%, more preferably not less than 96%, more preferably not less than 97%, and even more preferably not less than 98%. The upper limit of closed cell ratio of the present expanded particles is not limited, and can be, for example, 100%, 99%, 98%, or 97%. This configuration makes it possible to provide poly(3-hydroxyalkanoate)-based expanded particles having excellent in-mold foam moldability. Note that measurement of the closed cell ratio is carried out in accordance with the measurement method described in the Examples which will be described later.

3. Method for Producing Poly(3-Hydroxyalkanoate)-Based Expanded Particles

A method for producing poly(3-hydroxyalkanoate)-based expanded particles is not particularly limited, and a known method (e.g., a method described in International Publication No. WO 2019/146555) can be used. In the present specification, the "method for producing poly(3-hydroxyalkanoate)-based expanded particles" may be referred to as a "production method", and a "method for producing poly(3-hydroxyalkanoate)-based expanded particles in in accordance with an embodiment of the present invention" may be referred to as a "present production method".

Examples of specific aspects of the present production method include a production method including a resin particle preparation process of adjusting resin particles and an expansion process of expanding the resin particles, in this order, but the present production method is not limited to such a production method.

3-1. Resin Particle Preparation Process

The present production method preferably includes, before an expansion process, a resin particle preparation process of preparing (a) resin particles containing 100 parts by weight of P3HA and 0.10 parts by weight to 5.00 parts by weight of non-ionic water-soluble polymer or (b) resin particles consisting of 100 parts by weight of P3HA and 0.10 parts by weight to 5.00 parts by weight of non-ionic water-soluble polymer. The resin particle preparation process can also be described as a process of molding a resin into a shape that is easy to utilize for expansion. An aspect of the resin particle preparation process is not particularly limited, provided that it is possible to obtain resin particles.

The resin particle preparation process preferably includes:

(a) a melting and kneading step of melting and kneading a resin composition containing 100 parts by weight of P3HA and 0.10 parts by weight to 5.00 parts by weight of non-ionic water-soluble polymer; and (b) a particle molding step of molding a melted and kneaded resin composition into a shape that is easy to utilize for expansion.

An aspect of the melting and kneading step is not particularly limited, provided that it is possible to obtain a melted and kneaded resin composition. As specific examples of the melting and kneading step, the melting and kneading step is exemplified by, for example, the following methods (a1) and (a2):

(a1) a method in which 100 parts by weight of P3HA and 0.10 parts by weight to 5.00 parts by weight of non-ionic water-soluble polymer, and, if necessary, other additives are mixed or blended by a mixing device or the like so that a resin composition is prepared, and then the resin composition is supplied to a melting and kneading device so that the resin composition is melted and kneaded; and (a2) a method in which 100 parts by weight of P3HA and 0.10 parts by weight to 5.00 parts by weight of non-ionic water-soluble polymer, and, if necessary, other additives are supplied to a melting and kneading device to prepare (complete) a resin composition in the melting and kneading device and to melt and knead the resin composition in the melting and kneading device.

In the method (a1), an order in which 100 parts by weight of P3HA and 0.10 parts by weight to 5.00 parts by weight of non-ionic water-soluble polymer, and, if necessary, other additives are mixed or blended (dry-blended) is not particularly limited. In the method (a2), an order in which 100 parts by weight of P3HA and 0.10 parts by weight to 5.00 parts by weight of non-ionic water-soluble polymer, and, if necessary, other additives are supplied to the melting and kneading device is not particularly limited.

In the method (a1), the mixing device is not limited, and examples of the mixing device include a ribbon blender, a flash blender, a tumbler mixer, and Supermixer.

In the methods (a1) and (a2), the melting and kneading device is not limited, and examples of the melting and kneading device include an extruder, a kneader, a Banbury mixer, and a roll. The melting and kneading device is preferably an extruder and more preferably a twin screw extruder because they are excellent in productivity and convenience.

In the method (a1), an amount of the non-ionic water-soluble polymer used in mixing or blending and of the other additives used in mixing or blending is an amount of the non-ionic water-soluble polymer and other additives contained in resulting resin particles. In addition, in the method (a2), a supply amount of the non-ionic water-soluble polymer and the other additives supplied to the melting and kneading device is an amount of the non-ionic water-soluble polymer and other additives contained in resulting resin particles. Thus, regarding the amount of the non-ionic water-soluble polymer and other additives used and the supply amount thereof, the descriptions in the above (non-ionic water-soluble polymer) and (other additives) sections are employed. Note that, in the melting and kneading step in accordance with an embodiment of the present invention, P3HA to be used may already contain a non-ionic water-soluble polymer. In a case where P3HA to be used already contains a non-ionic water-soluble polymer, the non-ionic water-soluble polymer does not have to be used in the melting and kneading step. In addition, a total amount of the amount of the non-ionic polymer contained in P3HA and the amount of the non-ionic water-soluble polymer used in the melting and kneading step is the amount of the non-ionic water-soluble polymer contained in resulting resin particles. Further, it is not necessary to use, in the resin particle preparation process, all of the other additives used in the present production method. In other words, all or part of the other additives used in the present production method (e.g., a crosslinking agent, a plasticizer, and the like) may be added to a dispersion slurry in a dispersion step described later, without being used in the resin particle preparation process, that is, without being contained in the resin particles.

In the melting and kneading step, a temperature employed when the resin composition is melted and kneaded cannot be generally defined because such a temperature depends on, for example, physical properties (melting point, weight average molecular weight, etc.) of P3HA and the type of additive used. With regard to the temperature employed when the resin composition is melted and kneaded, for example, a temperature of a melted and kneaded resin composition discharged from a nozzle of a die (hereinafter may be referred to as a composition temperature) is preferably 150° C. to 200° C., more preferably 160° C. to 195° C., and even more preferably 170° C. to 190° C. In a case where the composition temperature is not lower than 150° C., it is unlikely that the resin composition is insufficiently melted and kneaded. On the other hand, in a case where the composition temperature is not higher than 200° C., pyrolysis of P3HA is unlikely to occur.

An aspect of the particle molding step is not particularly limited, provided that it is possible to mold a melted and kneaded resin composition into a desired shape. The use of a melting and kneading device including a die and a cutting device as the above-described melting and kneading device makes it possible to easily mold the melted and kneaded resin composition into a desired shape in the particle molding step. Specifically, the molding into a desired shape is achieved by discharging the melted and kneaded resin composition from the nozzle of the die provided in the melting and kneading device and cutting the resin composition by the cutting device simultaneously with the discharge. The shape of the resulting resin particles is not particularly limited, and is preferably a cylindrical shape, an elliptical columnar shape, a spherical shape, a cubic shape, a rectangular parallelepiped shape, or the like shape because they are easily utilized for expansion.

In the particle molding step, the resin composition discharged from the nozzle of the die may be cooled. In a case where the resin composition discharged from the nozzle of the die is cooled, the resin composition is cut by the cutting device simultaneously with cooling of the resin composition or after the resin composition has been cooled.

In the particle molding step, when the resin composition discharged from the nozzle of the die is cooled, a temperature exhibited by a cooled resin composition (hereinafter may be referred to as a cooling temperature) is not particularly limited. The cooling temperature is preferably 20° C. to 80° C., more preferably 30° C. to 70° C., and even more preferably 40° C. to 60° C. This configuration allows the melted and kneaded resin composition to be crystallized sufficiently quickly, and thus has an advantage of achieving good productivity of the resin particles.

The melt flow rate (MFR) of the resin particles is not particularly limited, and is preferably 1 g/10 min to 20 g/min, more preferably 1 g/10 min to 17 g/min, and even more preferably 1 g/min to 15 g/min. With this configuration, it is possible to obtain poly(3-hydroxyalkanoate)-based expanded particles with a high expansion ratio and a high closed cell ratio. Note that measurement of the melt flow rate of the resin particles is carried out in accordance with the measurement method described in the Examples which will be described later.

3-2. Expansion Process

An aspect of the expansion process in the present production method is not particularly limited, provided that it is possible to expand the resin particles. In an embodiment of the present invention, the expansion process can include a dispersion step of dispersing resin particles into an aqueous dispersion medium. A specific aspect of the dispersion step is not particularly limited, and the dispersion step is a step of dispersing, for example, resin particles, an aqueous dispersion medium, a crosslinking agent, and a blowing agent, and, if necessary, a dispersing agent, a crosslinking aid, a dispersing aid, and/or a plasticizer in a vessel. The expansion process preferably includes, as steps which are different from the dispersion step and are followed by the dispersion step, the following steps:

(a) a temperature increase and pressure increase step of increasing a temperature in the vessel to a certain temperature and increasing a pressure in the vessel to a certain pressure;

(b) a holding step of holding the temperature in the vessel at the certain temperature and holding the pressure in the vessel at the certain pressure; and (c) a release step of opening one end of the vessel to release a dispersion slurry in the vessel into an area (space) having a pressure lower than an expansion pressure (i.e., pressure in the vessel).

(Dispersion Step)

The dispersion step can also be described as, for example, a step of preparing a dispersion slurry in which resin particles, a crosslinking agent, and a blowing agent, and, if necessary, a dispersing agent, a crosslinking aid, a dispersing aid, and a plasticizer are dispersed in an aqueous dispersion medium. In the dispersion slurry, (a) the crosslinking agent and the crosslinking aid may not be present because of being consumed by reaction with P3HA in the resin particles, and (b) the blowing agent and the plasticizer may not be present in a dispersed state because of being impregnated in the resin particles.

The vessel is not particularly limited, and is preferably a vessel that can withstand an expansion temperature and an expansion pressure which will be described later, and is preferably, for example, a pressure-resistant vessel.

The aqueous dispersion medium is not particularly limited, provided that the aqueous dispersion medium allows the resin particles, the crosslinking agent, the blowing agent, and the like to be uniformly dispersed therein. As the aqueous dispersion medium, for example, tap water and/or industrial water can also be used. From the point that stable production of expanded particles is possible, pure water, such as RO water (water purified by a reverse osmosis membrane method), distilled water, and deionized water (water purified by ion exchange resin), ultrapure water, and the like are preferably used as the aqueous dispersion medium.

The amount of the aqueous dispersion medium used is not particularly limited, and is preferably 100 parts by weight to 1000 parts by weight with respect to 100 parts by weight of the resin particles.

In the present production method, it is preferable to use a crosslinking agent. By using the crosslinking agent, P3HA in resulting expanded particles becomes P3HA with a cross-linking structure. Since a crosslinking reaction of the P3HA in the resin particles also proceeds in the expansion process, the expansion process can also be described as a crosslinking process.

The crosslinking agent is not particularly limited, provided that the crosslinking agent can crosslink P3HA. As the crosslinking agent, an organic peroxide is preferable. In other words, the poly(3-hydroxyalkanoate)-based expanded particles are preferably cross-linked by an organic peroxide. The organic peroxide may be used (a) in the resin particle preparation process, (b) in the dispersion step, and (c) in the resin particle preparation process and the dispersion step. More specifically, in order to react the organic peroxide with the P3HA, (a) the organic peroxide and the P3HA may be melted and kneaded in the resin particle preparation process, (b) the resin particles and the organic peroxide may be dispersed in the aqueous dispersion medium in the dispersion step, and (c) the organic peroxide and the P3HA may be melted and kneaded, and further, the resin particles and the organic peroxide may be dispersed in the aqueous dispersion medium. In the dispersion step, the resin particles produced in the resin particle preparation process and the organic peroxide are dispersed in the aqueous dispersion medium, so that the resin particles can be impregnated and reacted with the organic peroxide. For these reasons, in the method for producing the present expanded particles, an organic peroxide is preferable as the crosslinking agent. Note that, in a case where an organic peroxide is used as the crosslinking agent, the cross-linking structure is formed by direct binding of molecular chains of P3HA (bypassing a structure derived from the crosslinking agent).

Depending on, for example, the type of P3HA used, the organic peroxide used as the crosslinking agent is preferably an organic peroxide having a 1-hour half-life temperature of 90° C. to 160° C. and is more preferably an organic peroxide having a 1-hour half-life temperature of 115° C. to 125° C. Specific examples of such an organic peroxide includes benzoyl peroxide (1-hour half-life temperature: 92° C.), t-butylperoxy-2-ethylhexyl carbonate (1-hour half-life temperature: 121° C.), t-butylperoxyisopropyl carbonate (1-hour half-life temperature: 118° C.), t-amylperoxy-2-ethylhexyl carbonate (1-hour half-life temperature: 117° C.), t-amylperoxyisopropyl carbonate (1-hour half-life temperature: 115° C.), t-butylperoxyisobutyrate (1-hour half-life temperature: 93° C.), t-butylperoxy-2-ethylhexanoate (1-hour half-life temperature: 95° C.), t-butylperoxyisononanoate (1-hour half-life temperature: 123° C.), t-butylperoxyacetate (1-hour half-life temperature: 123° C.), t-butylperoxydibenzoate (1-hour half-life temperature: 125° C.), t-amylperoxyisobutyrate (1-hour half-life temperature: 93° C.), t-amylperoxy-2-ethylhexanoate (1-hour half-life temperature: 92° C.), t-amylperoxyisonanoate (1-hour half-life temperature: 114° C.), t-amylperoxyacetate (1-hour half-life temperature: 120° C.), t-amylperoxybenzoate (1-hour half-life temperature: 122° C.), dicumyl peroxide (1-hour half-life temperature: 137° C.), 2,5-dimethyl-2,5-di(t-butylperoxy)hexane (1-hour half-life temperature: 140° C.), and di-t-butyl peroxide (1-hour half-life temperature: 149° C.). The use of an organic peroxide having a 1-hour half-life temperature of not lower than 90° C. has an advantage that expanded particles of a desired gel fraction tend to be obtained. On the other hand, the use of an organic peroxide having a 1-hour half-life temperature of not higher than 160° C. has an advantage that an unreacted crosslinking agent is unlikely to remain in a final product.

The amount of the crosslinking agent(s) used is not particularly limited, and is preferably 0.1 parts by weight to 5.0 parts by weight, more preferably 0.3 parts by weight to 3.0 parts by weight, and even more preferably 0.5 parts by weight to 2.5 parts by weight, with respect to 100 parts by weight of the resin particles. In a case where the amount of the crosslinking agent(s) used is not less than 0.1 parts by weight with respect to 100 parts by weight of the resin particles, (a) it is possible to sufficiently crosslink resulting expanded particles, and (b) the closed cell ratio of the resulting expanded particles becomes high, so that it is possible to obtain a good foamed molded product. On the other hand, in a case where the amount of the crosslinking agent(s) used is not more than 5.0 parts by weight with respect to 100 parts by weight of the resin particles, an effect corresponding to the amount of the crosslinking agent added is obtained, and economical waste is thus unlikely to occur. The amount of the crosslinking agent(s) used is positively correlated with the gel fraction of expanded particles and has a great influence on the value of the gel fraction of expanded particles. Therefore, it is desirable to strictly set the amount of the crosslinking agent(s) used in consideration of the gel fraction of resulting expanded particles. In the dispersion step in accordance with an embodiment of the present invention, there may be a case where resin particles to be used already contain a crosslinking agent. In such a case, it is preferable that a total amount of the amount of the crosslinking agent that the resin particles already contain before the dispersion step and the amount of the crosslinking agent used in the dispersion step satisfy the range described above.

Examples of the blowing agent include: inorganic gases such nitrogen, carbon dioxide, and air; saturated hydrocarbons each having 3 to 5 carbon atoms such as propane, normal butane, isobutane, normal pentane, isopentane, and neopentane; ethers such as dimethyl ether, diethyl ether, and methyl ethyl ether; halogenated hydrocarbons such as monochlormethane, dichloromethane, and dichlorodifluoroethane; and water. As the blowing agent, at least one selected from the group consisting of the above-described inorganic gases, saturated hydrocarbons each having 3 to 5 carbon atoms, ethers, halogenated hydrocarbons, and water can be used. Among these blowing agents, nitrogen or carbon dioxide is preferably used as the blowing agent from the viewpoint of environmental load and expansion power. One of these blowing agents may be used alone, or two or more thereof may be used in admixture. When two or more blowing agents are used in admixture, a mixing ratio may be adjusted as appropriate according to the purpose.

The amount of the blowing agent(s) used is not particularly limited, and is preferably 2 parts by weight to 10000 parts by weight, more preferably 5 parts by weight to 5000 parts by weight, and even more preferably 10 parts by weight to 1000 parts by weight, with respect to 100 parts by weight of the resin particles. In a case where the amount of the blowing agent(s) used is not less than 2 parts by weight with respect to 100 parts by weight of the resin particles, it is possible to obtain expanded particles having a high expansion ratio. On the other hand, in a case where the amount of the blowing agent(s) used is not more than 10000 parts by weight with respect to 100 parts by weight of the resin particles, an effect corresponding to the amount of the blowing agent(s) used is obtained, and thus no economical waste occurs.

In the present production method, it is preferable to use a dispersing agent. The use of the dispersing agent has an advantage of making it possible to inhibit adhesion (which may be referred to as blocking) of the resin particles to each other and making it possible to produce expanded particles stably. Examples of the dispersing agent include inorganic substances such as tertiary calcium phosphate, tertiary magnesium phosphate, basic magnesium carbonate, calcium carbonate, barium sulfate, kaolin, talc, clay, aluminum oxide, titanium oxide, and aluminum hydroxide. One of these dispersing agents may be used alone, or two or more thereof may be used in admixture. When two or more dispersing agents are used in admixture, a mixing ratio may be adjusted as appropriate according to the purpose.

The amount of the dispersing agent(s) used is not particularly limited, and is preferably 0.1 parts by weight to 3.0 parts by weight, and more preferably 0.5 parts by weight to 1.5 parts by weight, with respect to 100 parts by weight of the resin particles.

In the present production method, a crosslinking aid may be used to improve the crosslinking efficiency of P3HA. Examples of the crosslinking aid include compounds each having at least one unsaturated bond within a molecule. Among the compounds, allyl esters, acrylic esters, methacrylic esters, divinyl compounds, and the like are preferable as the crosslinking aid. One of these crosslinking aids may be used alone, or two or more thereof may be used in admixture. When two or more crosslinking aids are used in admixture, a mixing ratio may be adjusted as appropriate according to the purpose.

The amount of the crosslinking aid(s) used is not particularly limited, and is preferably 0.01 parts by weight to 3.00 parts by weight, more preferably 0.03 parts by weight to 1.50 parts by weight, and even more preferably 0.05 parts by weight to 1.00 part by weight, with respect to 100 parts by weight of the resin particles. If the amount of the crosslinking aid(s) used is not less than 0.01 parts by weight with respect to 100 parts by weight of the resin particles, the crosslinking aid(s) exerts a sufficient effect as the crosslinking aid.

In a case where the resin particles are impregnated and reacted with the crosslinking agent(s) and, if necessary, the crosslinking aid(s) in the dispersion step, it is preferable to lower the concentration of oxygen in the vessel and the amount of dissolved oxygen in the dispersion slurry in order to increase the crosslinking efficiency of P3HA. Examples of a method for reducing the concentration of oxygen in the vessel and the amount of dissolved oxygen in the dispersion slurry include replacing a gas in the vessel and the gas dissolved in the dispersion slurry with inorganic gases such as carbon dioxide and nitrogen, and vacuuming the gas in the vessel.

In the present production method, a dispersing aid may be used to improve the effect of inhibiting the adhesion of the resin particles to each other. Examples of the dispersing aid include anionic surfactants such as sodium alkanesulfonate, sodium alkylbenzene sulfonate, and sodium α-olefin sulfonate. One of these dispersing aids may be used alone, or two or more thereof may be used in admixture. When two or more dispersing aids are used in admixture, a mixing ratio may be adjusted as appropriate according to the purpose.

The amount of the dispersing aid(s) used is not particularly limited, and is preferably 0.001 parts by weight to 0.500 parts by weight, and more preferably 0.010 parts by weight to 0.200 parts by weight, with respect to 100 parts by weight of the resin particles. In order to further improve the effect of inhibiting the adhesion of the resin particles to each other, it is preferable that the dispersing agent(s) and the dispersing aid(s) are used in combination.

In the present production method, a plasticizer may be used. The use of the plasticizer makes it possible to obtain expanded particles having a high expansion ratio and plasticity.

Examples of the plasticizer used in the present production method or the plasticizer suitably used in the present production method include the plasticizers described earlier in the (Additives) section of [2. Poly(3-hydroxyalkanoate)-based expanded particles].

The amount of the plasticizer used is not particularly limited, and is preferably more than 0 parts by weight and not more than 20 parts by weight, more preferably 1 part by weight to 15 parts by weight, and even more preferably 1 part by weight to 10 parts by weight, with respect to 100 parts by weight of the resin particles. In the dispersion step in accordance with an embodiment of the present invention, the resin particles to be used may already contain a plasticizer. In a case where the resin particles to be used already contain the plasticizer, it is preferable that the total amount of the amount of the plasticizer contained in the resin particles and the amount of the plasticizer used in the dispersion step satisfy the range described above.

(Temperature Increase and Pressure Increase Step and Holding Step)

The temperature increase and pressure increase step is preferably carried out after the dispersion step, and the holding step is preferably carried out after the temperature increase and pressure increase step. In the present specification, (a) a certain temperature in the temperature increase and pressure increase step and in the holding step may be referred to as an expansion temperature, and (b) a certain pressure in the temperature increase and pressure increase step and in the holding step may be referred to as an expansion pressure.

The expansion temperature cannot be generally defined because the expansion temperature varies depending on, for example, the type of P3HA, the type of blowing agent, and a desired expansion ratio of expanded particles. For example, the expansion temperature is preferably 100.0° C. to 140.0° C., more preferably 110.0° C. to 135.0° C., and more preferably 115.0° C. to 133.0° C. In a case where the expansion temperature is not lower than 100° C., there is a tendency to obtain expanded particles with a high expansion ratio. On the other hand, in a case where the expansion temperature is not higher than 140° C., hydrolysis of resin particles in the vessel is unlikely to occur.

In the temperature increase and pressure increase step, a rate at which the temperature is increased to a desired expansion temperature (hereinafter may be referred to as a temperature increase rate) is preferably 1.0° C./min to 3.0° C./min, and more preferably 1.5° C./min to 3.0° C./min. In a case where the temperature increase rate is not lower than 1.0° C./min, excellent productivity is achieved. In a case where the temperature increase rate is not higher than 3.0° C./min, insufficient impregnation of the resin particles with the blowing agent and insufficient reaction of the crosslinking agent and P3HA are unlikely to occur at the increase in temperature.

The expansion pressure is preferably 1.0 MPa to 10.0 MPa (gauge pressure), more preferably 2.0 MPa to 5.0 MPa (gauge pressure), and more preferably 2.5 MPa to 4.0 MPa. In a case where the expansion pressure is not less than 1.0 MPa (gauge pressure), it is possible to obtain expanded particles with a high expansion ratio.

(Release Step)

The release step is preferably carried out after the temperature increase and pressure increase step or after the holding step. The release step allows the resin particles to be expanded, with the result that expanded particles are obtained.

In the release step, an "area having a pressure lower than the expansion pressure" is intended to mean an "area under pressure lower than the expansion pressure" or a "space under pressure lower than the expansion pressure", and can also be described as an "atmosphere having a pressure lower than the expansion pressure". The area having a pressure lower than the expansion pressure is not particularly limited, provided that the pressure is lower than the expansion pressure, and may be, for example, an area under atmospheric pressure.

In the release step, when the dispersion slurry is released into the area having a pressure lower than the expansion pressure, the dispersion slurry can also be released through an open orifice with a diameter of 1 mm to 5 mm for the purpose of, for example, adjusting the flow rate of the dispersion slurry and decreasing variations in the expansion ratio of the resulting expanded particles. In addition, in a case where resin particles with a relatively high melting point are used, the area (space) having a pressure lower than the expansion pressure may be filled with saturated steam for the purpose of improving expandability.

In the release step, a cleaning agent may be used after the resin particles have been expanded. Examples of the cleaning agent include warm water and sodium hexametaphosphate. The use of the cleaning agent makes it possible to adjust the dispersing agent adhering to the surfaces of the expanded particles.

In the release step, an antistatic agent may be used after the resin particles have been expanded. Examples of the antistatic agent include coconut oil fatty acid diethanolamide. The use of the antistatic agent makes it possible to reduce static electricity of expanded particles and increase handleability.

The method for producing the present expanded particles is most preferably the above-described present production method, but is not limited to this method. For example, the present expanded particles can be obtained by the production methods described below in (r1) to (r3):

(r1) A method in which: the resin particles having been obtained by the aforementioned (resin particle preparation process) are placed in a pressure-resistant vessel, and the blowing agent is injected into the pressure-resistant vessel without using the aqueous dispersion medium; if necessary, the temperature of the pressure-resistant vessel is increased and held to obtain resin particles containing the blowing agent; and then, after the pressure of the pressure-resistant vessel has been reduced and returned to atmospheric pressure, the resin particles containing the blowing agent are heated in the pressure-resistant vessel by a heating means such as steam or transferred into another pressure-resistant vessel and heated by the heating means, and the resin particles impregnated with the blowing agent are expanded to obtain expanded particles.

(r2) A method in which: in the aforementioned (melting and kneading step) in the aforementioned (resin particle preparation process), when the resin composition is melted and kneaded, the crosslinking agent and the blowing agent are injected into the melting and kneading device so that the resin composition containing the crosslinking agent and the blowing agent is prepared; then, the resin composition is discharged from the nozzle of the die provided in the melting and kneading device, and the resin composition is cut by the cutting device while being cooled simultaneously with the discharge, so that resin particles containing the blowing agent are obtained; and the resin particles are transferred into a pressure-resistant vessel and heated by a heating means such as steam, and the resin particles are expanded to obtain expanded particles.

(r3) A method in which: in the aforementioned (melting and kneading step) in the aforementioned (resin particle preparation process), when the resin composition is melted and kneaded, the crosslinking agent and the blowing agent are injected into the melting and kneading device so that the resin composition containing the crosslinking agent and the blowing agent is prepared; then, the resin composition is discharged from the nozzle of the die provided in the melting and kneading device, and the resin composition is cut by the cutting device while being expanded simultaneously with the discharge, so that expanded particles are obtained.

In (r1) above, a pressure applied when the blowing agent is injected into the pressure-resistant vessel is preferably 0.01 MPa (gauge pressure) to 10.00 MPa (gauge pressure), and more preferably 0.03 MPa (gauge pressure) to 5.00 MPa (gauge pressure).

In (r1) and (r2) above, a temperature in the pressure-resistant vessel when the resin particles containing the blowing agent are heated by steam or the like is preferably 100° C. to 150° C., and more preferably 105° C. to 145° C.

In (r2) and (r3) above, a pressure applied when the crosslinking agent and the blowing agent are injected into the melting and kneading device is preferably 3 MPa (gauge pressure) to 30 MPa (gauge pressure), and more preferably 5 MPa (gauge pressure) to 15 MPa (gauge pressure).

(Secondary Expansion Process)

In the above-described method for producing expanded particles, there is a case where expanded particles having a desired apparent density cannot be obtained by the expansion process alone. In that case, the method for producing expanded particles may further include a secondary expansion process to further expand the expanded particles obtained in the expansion process. The secondary expansion process is not particularly limited, provided that, by further expanding the expanded particles having been obtained in the expansion process, expanded particles having an apparent density even lower than the apparent density of the expanded particles having been obtained in the expansion process. For example, an aspect of the secondary expansion process is as follows: (s1) The expanded particles having been obtained in the expansion process are supplied into the vessel. (s2) The inorganic gas, such as air or carbon dioxide, is supplied into the vessel to increase the pressure in the vessel. (s3) By (s2) above, the expanded particles are impregnated with the inorganic gas to make the pressure in the expanded particles higher than normal pressure. (s4) Then, the expanded particles are further expanded by heating with steam or the like to obtain expanded particles having a desired apparent density. The expanded particles obtained in the secondary expansion process may be referred to as secondary expanded particles. In addition, in a case where the secondary expansion process is carried out, the expansion process may be referred to as first expansion process, and the expanded particles obtained in the first expansion process may be referred to as first expanded particles.

The internal pressure of the expanded particles in the secondary expansion process is preferably 0.15 MPa to 0.60 MPa (absolute pressure), and more preferably 0.20 MPa to 0.50 MPa (absolute pressure).

A temperature in the vessel when the expanded particles are impregnated with the inorganic gas in the secondary expansion process (in s2 and s3 above) is preferably 10° C. to 90° C., more preferably 20° C. to 90° C., more preferably 30° C. to 90° C., and even more preferably 40° C. to 90° C.

In the secondary expansion process (in s4 above), the pressure of steam or the like for heating the expanded particles (hereinafter may be referred to as a "secondary expansion pressure") varies depending on the properties of the expanded particles to be used and a desired apparent density and cannot be generally defined. The secondary expansion pressure is preferably 0.01 MPa to 0.17 MPa (gauge pressure), and more preferably 0.03 MPa to 0.11 MPa (gauge pressure).

The gel fraction of the secondary expanded particles preferably has the same aspect as the gel fraction of the expanded particles. That is, the description in the (Gel fraction) section described above can be employed, as appropriate, as the gel fraction of the secondary expanded particles.

4. Poly(3-Hydroxyalkanoate)-Based Foamed Molded Product

A poly(3-hydroxyalkanoate)-based foamed molded product in accordance with an embodiment of the present invention is the one composed of poly(3-hydroxyalkanoate)-based expanded particles in accordance with an embodiment of the present invention. The poly(3-hydroxyalkanoate)-based foamed molded product in accordance with an embodiment of the present invention may be the one molded from poly(3-hydroxyalkanoate)-based expanded particles in accordance with an embodiment of the present invention. The poly(3-hydroxyalkanoate)-based foamed molded product in accordance with an embodiment of the present invention may be the one containing poly(3-hydroxyalkanoate)-based expanded particles in accordance with an embodiment of the present invention. With this configuration, it is possible to provide a poly(3-hydroxyalkanoate)-based foamed molded product with a high expansion ratio.

A method for producing the present foamed molded product (i.e., a method for subjecting expanded particles to molding) is not particularly limited, and a known method can be employed. Examples of such a method include, but are not particularly limited to, the following in-mold foam molding methods (A) to (D):

(A) A method in which the present expanded particles are pressurized with inorganic gas in a vessel so that the expanded particles are impregnated with the inorganic gas and have a given internal pressure, after which the expanded particles are filled into a mold and heated with steam;

(B) A method in which the present expanded particles are filled into a mold, compressed to reduce the volume in the mold by 10% to 75%, and heated with steam;

(C) A method in which the present expanded particles are compressed with gas pressure, filled into a mold, and heated with steam while compression recovery of the expanded particles is utilized; and (D) A method in which the present expanded particles are filled into a mold and heated with steam without any particular pretreatment.

In the production for the present foamed molded product, the pressure of steam for heating the present expanded particles (hereinafter may be referred to as a molding pressure) varies depending on the properties of the expanded particles to be used and the like and cannot be generally defined. The molding pressure is preferably 0.05 MPa to 0.30 MPa (gauge pressure), more preferably 0.08 MPa to 0.25 MPa (gauge pressure), and even more preferably 0.10 MPa to 0.20 MPa (gauge pressure).

As the inorganic gas in the method (A) among the production methods for the present foamed molded product, at least one selected from the group consisting of air, nitrogen, oxygen, carbon dioxide, helium, neon, argon, and the like can be used. Among these inorganic gases, air and/or carbon dioxide is preferable.

A temperature in the vessel when the expanded particles are impregnated with the inorganic gas in the method (A) among the production methods for the present foamed molded product is preferably 10° C. to 90° C., more preferably 20° C. to 90° C., more preferably 30° C. to 90° C., and even more preferably 40° C. to 90° C.

The internal pressure of the expanded particles in the method (A) among the production methods for the present foamed molded product is preferably 0.10 MPa to 0.30 MPa (absolute pressure), more preferably 0.11 MPa to 0.25 MPa (absolute pressure), and even more preferably 0.12 MPa to 0.20 MPa (absolute pressure). Measurement of the internal pressure of the expanded particles is carried out in accordance with the measurement method described in the Examples which will be described later.

The expansion ratio of the present foamed molded product is not limited, and is preferably not less than 25 times, more preferably not less than 27 times, more preferably not less than 30 times, and even more preferably not less than 35 times. The upper limit of the expansion ratio of the present foamed molded product is not limited, and can be, for example, 50 times, 40 times, or 35 times. With this configuration, it is possible to provide a poly(3-hydroxyalkanoate)-based foamed molded product that balances mechanical strength and lightness.

An embodiment of the present invention may have the following configurations.

<1> Poly(3-hydroxyalkanoate)-based expanded particles including: a poly(3-hydroxyalkanoate)-based resin (A); and a non-ionic water-soluble polymer (B), the poly(3-hydroxyalkanoate)-based expanded particles containing the non-ionic water-soluble polymer (B) in an amount of 0.10 parts by weight to 5.00 parts by weight with respect to 100 parts by weight of the poly(3-hydroxyalkanoate)-based resin (A), the poly(3-hydroxyalkanoate)-based expanded particles having a closed cell ratio of not less than 90%.

<2> The poly(3-hydroxyalkanoate)-based expanded particles described in <1>, wherein the non-ionic water-soluble polymer (B) has a hydrophobic group.

<3> The poly(3-hydroxyalkanoate)-based expanded particles described in <1> or <2>, wherein the non-ionic water-soluble polymer (B) is biodegradable.

<4> The poly(3-hydroxyalkanoate)-based expanded particles described in any one of <1> to <3>, wherein the non-ionic water-soluble polymer (B) is at least one selected from the group consisting of polyalkylene oxide, polyvinyl alcohol, and a cellulose derivative.

<5> The poly(3-hydroxyalkanoate)-based expanded particles described in <4>, wherein the poly(3-hydroxyalkanoate)-based expanded particles contains the non-ionic water-soluble polymer (B) in an amount of 0.10 parts by weight to 1.00 part by weight with respect to 100 parts by weight of the poly(3-hydroxyalkanoate)-based resin (A).

<6> The poly(3-hydroxyalkanoate)-based expanded particles described in any one of <1> to <5>, wherein the poly(3-hydroxyalkanoate)-based resin (A) is at least one selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

<7> The poly(3-hydroxyalkanoate)-based expanded particles described in any one of <1> to <6>, wherein the poly(3-hydroxyalkanoate)-based resin (A) is a copolymer having a 3-hydroxybutyrate unit and a comonomer unit, and a ratio of the 3HB unit to the comonomer unit (the 3HB unit/the comonomer unit) in 100 mol % of all repeating units in the copolymer is 99/1 (mol %/mol %) to 85/15 (mol %/mol %).

<8> The poly(3-hydroxyalkanoate)-based expanded particles described in any one of <1> to <7>, wherein the poly(3-hydroxyalkanoate)-based expanded particles have an apparent density of 20 g/L to 67 g/L.

<9> The poly(3-hydroxyalkanoate)-based expanded particles described in any one of <1> to <8>, wherein the poly(3-hydroxyalkanoate)-based expanded particles have a high temperature-side heat quantity of 0.1 J/g to 20.0 J/g.

<10> The poly(3-hydroxyalkanoate)-based expanded particles described in any one of <1> to <9>, wherein the poly(3-hydroxyalkanoate)-based expanded particles have a cell diameter of 50 μm to 500 μm.

<11> The poly(3-hydroxyalkanoate)-based expanded particles described in any one of <1> to <10>, wherein the poly(3-hydroxyalkanoate)-based expanded particles have a gel fraction of not less than 30% by weight.

<12> A poly(3-hydroxyalkanoate)-based foamed molded product including the poly(3-hydroxyalkanoate)-based expanded particles according to any one of <1> to <11>.

<13> The poly(3-hydroxyalkanoate)-based foamed molded product described in <12>, wherein the poly(3-hydroxyalkanoate)-based foamed molded product has an expansion ratio of not less than 25 times.

EXAMPLES

The following description will discuss the present invention in more detail with reference to Examples. Note, however, that these Examples do not limit the technical scope of the present invention.

[Materials]

Substances used in the Examples and Comparative Examples are presented below.

(Water-Soluble Polymer)

Water-soluble polymer 1: non-ionic polyvinyl alcohol (Kuraray Poval PVA-205 manufactured by Kuraray Co., Ltd.; saponification: 87.0 mol % to 89.0 mol %; polymerization degree: 500; hydrophobic group: acetic acid group)

Water-soluble polymer 2: non-ionic polyalkylene oxide (Plonon #208 manufactured by NOF CORPORATION; 80% by weight of ethylene oxide; average molecular weight: 10000; hydrophobic group: oxypropylene group)

Water-soluble polymer 3: non-ionic cellulose derivative (Metolose MCE-4000 manufactured by Shin-Etsu Chemical Co., Ltd.; 25.0% to 33.0% of methoxy group; hydrophobic group: methoxy group)

Water-soluble polymer 4: non-ionic polyalkylene oxide (Emulsogen EPN 287 manufactured by CLARIANT; 28 mol % of ethylene oxide; molecular weight: 1404; hydrophobic group: oxypropylene group)

Water-soluble polymer 5: ionic polyalkylene oxide (Emulsogen EPN 073 manufactured by CLARIANT; 7 mol % of ethylene oxide; molecular weight: 577; hydrophobic group: oxypropylene group)

All of the above-described five water-soluble polymers have hydrophilic and hydrophobic groups and are biodegradable.

(Cell Adjusting Agent)

Cell adjusting agent: talc (Talcan Powder PK-S manufactured by Hayashi-Kasei Co., Ltd.)

(Crystal Nucleating Agent)

Crystal nucleating agent: pentaerythritol (Neulizer P manufactured by Mitsubishi Chemical Corporation)

(Lubricant)

Lubricant 1: behenic acid amide (Crodamide BR manufactured by CRODA)

Lubricant 2: erucic acid amide (Crodamide ER manufactured by CRODA)

(Dispersing Agent)

Dispersing agent: tertiary calcium phosphate (manufactured by TAIHEI CHEMICAL INDUSTRIAL CO., LTD.)

(Dispersing Aid)

Dispersing aid: sodium alkylsulfonate (LATEMUL PS manufactured by Kao Corporation)

(Crosslinking Agent)

Crosslinking agent: t-butylperoxy-2-ethylhexyl carbonate (content: 97%) (PERBUTYL E manufactured by NOF CORPORATION)

(Cleaning Agent)

Cleaning agent: sodium hexametaphosphate (manufactured by WUXI LOTUS ESSENCE)

(Antistatic Agent)

Antistatic agent: coconut oil fatty acid diethanolamide (PROFAN 128 EXTRA manufactured by Sanyo Chemical Industries, Ltd.)

[Measurement Method]

Evaluation methods carried out in the Examples and Comparative Examples are described below.

(Measurement of Melting Point of Poly(3-Hydroxyalkanoate)-Based Resin Particles)

Approximately 5 mg of poly(3-hydroxyalkanoate)-based resin particles were weighed and collected with use of a differential scanning calorimeter (DSC7020 manufactured by Hitachi High-Tech Science Corporation). Then, in a DSC curve obtained when the temperature of the poly(3-hydroxyalkanoate)-based resin particles was increased from 10° C. to 190° C. at a temperature increase rate of 10° C./min, a temperature at the highest melting peak was assumed to be a melting point.

(Measurement of MFR of Poly(3-Hydroxyalkanoate)-Based Resin Particles)

With use of Melt Flow Index Tester (manufactured by Yasuda Seiki Seisakusho Ltd.), measurement was carried out in accordance with JIS K7210 under the conditions in which a load was 5 kg, and a measurement temperature was in a range from a temperature 5° C. higher than a melting end temperature to a temperature 10° C. higher than the melting end temperature as read from the DSC curve obtained in (Measurement of melting point of poly(3-hydroxyalkanoate)-based resin particles) above.

(Measurement of Specific Gravity of Poly(3-Hydroxyalkanoate)-Based Resin Particles)

With use of an automatic densimeter (DSG-1 manufactured by Toyo Seiki Seisaku-sho Ltd.), a specific gravity ($g/cm^3$) of poly(3-hydroxyalkanoate)-based resin particles was measured by a method of collecting gas over water in accordance with JIS K7112.

(Measurement of Apparent Density of Poly(3-Hydroxyalkanoate)-Based Expanded Particles)

A method for measuring an apparent density of poly(3-hydroxyalkanoate)-based expanded particles was as below in (1) to (3): (1) A graduated cylinder containing ethanol was prepared, and poly(3-hydroxyalkanoate)-based expanded particles having a weight Wd (g) were submerged in the ethanol. (2) A volume of the poly(3-hydroxyalkanoate)-based expanded particles read from an elevation of liquid level of ethanol (submersion method) was assumed to be Vd ($cm^3$). (3) The apparent density ρd of the poly(3-hydroxyalkanoate)-based expanded particles was calculated by the following formula: Apparent density ρd ($g/cm^3$)=Wd/Vd (Measurement of Expansion Ratio of Poly(3-Hydroxyalkanoate)-Based Expanded Particles)

An expansion ratio of poly(3-hydroxyalkanoate)-based expanded particles was calculated by the following formula: Expansion ratio (times)=Specific gravity of poly(3-hydroxyalkanoate)-based resin particles/Apparent density ρd of poly(3-hydroxyalkanoate)-based expanded particles (Measurement of Gel Fraction of Poly(3-Hydroxyalkanoate)-Based Expanded Particles)

A method for measuring a gel fraction of poly(3-hydroxyalkanoate)-based expanded particles was as below in (a1) to (a5): (a1) In a 100-ml flask, 0.5 g of poly(3-hydroxyalkanoate)-based expanded particles and 50 ml of chloroform were placed. (a2) A mixture in the flask was heat-refluxed for 8 hours at 62° C. under atmospheric pressure. (a3) A resulting heat-treated product was filtered with use of a suction filtration device equipped with a 100-mesh metal gauze. (a4) A filtration-treated product on the metal gauze was dried in an oven at 80° C. for 8 hours, and a dried product weight Wg (g) was measured. (a5) The gel fraction was calculated by the following formula:

$$\text{Gel fraction (\% by weight)} = Wg/0.5 \times 100$$

(Measurement of High Temperature-Side Heat Quantity of Poly(3-Hydroxyalkanoate)-Based Expanded Particles)

A high temperature-side heat quantity of poly(3-hydroxyalkanoate)-based expanded particles was measured with use of a differential scanning calorimeter (DSC7020 manufactured by Hitachi High-Tech Science Corporation). A specific operating procedure was as below in (1) to (5): (1) Approximately 5 mg of poly(3-hydroxyalkanoate)-based expanded particles were weighed and collected. (2) By increasing the temperature of the poly(3-hydroxyalkanoate)-based expanded particles from 10° C. to 190° C. at a temperature increase rate of 10° C./min, the poly(3-hydroxyalkanoate)-based expanded particles were melted. (3) On the DSC curve obtained in the above-described process (2), a point representing a temperature before the melting started and a point representing a temperature after the melting ended were connected to create a baseline. (4) A straight line passing through a maximum point between a melting peak on the high temperature side or the highest melting peak and a melting peak adjacent thereto was drawn in a direction perpendicular to the X-axis. (5) A heat quantity calculated from a high temperature side area enclosed by the baseline, the straight line passing through the maximum point, and the DSC curve was assumed to be the high temperature-side heat quantity.

(Measurement of Average Cell Diameter of Poly(3-Hydroxyalkanoate)-Based Expanded Particles)

A method for measuring an average cell diameter of an expanded particle was as below in (1) to (5): (1) An expanded particle was cut with use of a blade razer (two-edged blade of high stainless steel manufactured by FEATHER Safety Razor Co., Ltd.) in such a manner that the razor passed through the center of the expanded particle. (2) A cut surface of the expanded particle thus obtained was observed with use of an optical microscope (VHX-100 manufactured by Keyence Corporation) at a magnification of 50 times. (3) In an image thus obtained through the observation, a straight line was drawn so as to pass through the center of the cut surface of the expanded particle or substantially the center of the cut surface of the expanded particle. (4) (4-1) The number n of cells present on the straight line was counted, and (4-2) a length of a line segment cut from the straight line by points at which the straight line and a surface of the expanded particle intersected with each other was measured and assumed to be an expanded particle diameter L. (5) The average cell diameter of the expanded particle was calculated by the following formula:

$$\text{Average cell diameter } (\mu m) = L/n$$

(Measurement of Closed Cell Ratio of Poly(3-Hydroxyalkanoate)-Based Expanded Particles)

Measurement of a closed cell ratio of poly(3-hydroxyalkanoate)-based expanded particles was carried out in accordance with the method described in Procedure C (PROCEDURE C) in ASTMD 2856-87. First, with use of an air comparison pycnometer (Model 1000 manufactured by Tokyo Science Co., Ltd.), a volume Vc ($cm^3$) was measured. Next, the whole expanded particles the volume Vc of which had been measured were submerged in a graduated cylinder containing ethanol. Then, the apparent volume Va ($cm^3$) of the expanded particles was determined from an elevation of liquid level in the graduated cylinder (submersion method). The closed cell ratio of the expanded particles was determined based on 100−(Va−Vc)×100/Va (%).

(Measurement of Internal Pressure of Poly(3-Hydroxyalkanoate)-Based Expanded Particles)

A method for measuring an internal pressure of poly(3-hydroxyalkanoate)-based expanded particles was as below in (1) to (5): (1) A weight W1 (g) of poly(3-hydroxyalkanoate)-based expanded particles after a pressurization process was measured. (2) The expanded particles were heated at 150° C. for 30 minutes to dissipate inorganic gas in the expanded particles. (3) A weight W2 (g) of the poly(3-hydroxyalkanoate)-based expanded particles having undergone dissipation of inorganic gas was measured again. (4) A weight (ΔW) of inorganic gas was calculated from a weight difference (W1−W2) between the poly(3-hydroxyalkanoate)-based expanded particles before the dissipation of inorganic gas and the poly(3-hydroxyalkanoate)-based expanded particles after the dissipation of inorganic gas. (5) An internal pressure P (MPa) of the poly(3-hydroxyalkanoate)-based expanded particles was calculated by the state equation of ideal gas, specifically, the following equation:

$$\text{Internal pressure } P\text{ (MPa)}=(1+\Delta W/M\times 0.082\times(273+T)\times(\rho d\times 1000/W2))/9.87,$$

wherein M is an average molar molecular weight, T is a temperature (room temperature) (° C.) when the weight of the poly(3-hydroxyalkanoate)-based expanded particles after the pressurization process was measured, and ρd is an apparent density (g/$cm^3$) of the poly(3-hydroxyalkanoate)-based expanded particles (expanded particles having the weight W1) after the pressurization process.

(Measurement of Expansion Ratio of Poly(3-Hydroxyalkanoate)-Based Foamed Molded Product)

A method for measuring a ratio of a poly(3-hydroxyalkanoate)-based foamed molded product was as below in (1) to (4): (1) With use of a digital vernier caliper (manufactured by Mitutoyo Corporation), respective lengths (mm) of a resulting poly(3-hydroxyalkanoate)-based foamed molded product in longitudinal, lateral, and thickness directions thereof were measured, and a volume V ($cm^3$) of the poly(3-hydroxyalkanoate)-based foamed molded product was calculated. (2) A weight W (g) of the foamed molded product was measured. (3) A density p of the poly(3-hydroxyalkanoate)-based foamed molded product was calculated based on the following formula: Density p (g/$cm^3$) =W/V. (4) An expansion ratio of the foamed molded product was calculated based on the following formula: Expansion ratio (times)=Specific gravity/Density ρ of foamed molded product Raw materials (P3HA-1 to P3HA-7) for poly(3-hydroxyalkanoate)-based expanded particles were prepared by the following methods.

[Production Example 1] Preparation of P3HA-1

P3HA-1 was prepared by the method described in International Publication No. WO 2018/070492. At this time, 1.00 part by weight of the water-soluble polymer 1 (Kuraray Poval PVA-205 manufactured by Kuraray Co., Ltd.) was used with respect to 100 parts by weight of P3HA. The resulting P3HA-1 contained (a) P3HB3HH having a monomer ratio of 3HB/3HH=95/5 (mol %/mol %) and a weight average molecular weight of 0.6 million and (b) 1.00 part by weight of the water-soluble polymer 1 with respect to 100 parts by weight of the P3HB3HH.

[Production Example 2] Preparation of P3HA-2

P3HA-2 was prepared by the method described in International Publication No. WO 2018/070492. At this time, 1.00 part by weight of the water-soluble polymer 2 (Plonon #208 manufactured by NOF CORPORATION) was used, instead of the water-soluble polymer 1, with respect to 100 parts by weight of the P3HA. The resulting P3HA-2 contained (a) P3HB3HH having a monomer ratio of 3HB/3HH=95/5 (mol %/mol %) and a weight average molecular weight of 0.6 million and (b) 1.00 part by weight of the water-soluble polymer 2 with respect to 100 parts by weight of the P3HB3HH.

[Production Example 3] Preparation of P3HA-3

P3HA-3 was prepared by the method described in International Publication No. WO 2018/070492. At this time, 1.00 part by weight of the water-soluble polymer 2 (Plonon #208 manufactured by NOF CORPORATION) and 0.50 parts by weight of the water-soluble polymer 3 (Metolose MCE-4000 manufactured by Shin-Etsu Chemical Co., Ltd.) were used, instead of the water-soluble polymer 1, with respect to 100 parts by weight of the P3HA. The resulting P3HA-3 contained (a) P3HB3HH having a monomer ratio of 3HB/3HH=95/5 (mol %/mol %) and a weight average molecular weight of 0.6 million and (b) 1.00 part by weight of the water-soluble polymer 2 and 0.50 parts by weight of the water-soluble polymer 3 with respect to 100 parts by weight of the P3HB3HH.

[Production Example 4] Preparation of P3HA-4

P3HA-4 was prepared by the method described in International Publication No. WO 2018/070492. At this time, 1.00 part by weight of the water-soluble polymer 4 (Emulsogen EPN 287 manufactured by CLARIANT) was used, instead of the water-soluble polymer 1, with respect to 100 parts by weight of the P3HA. The resulting P3HA-4 contained (a) P3HB3HH having a monomer ratio of 3HB/3HH=95/5 (mol %/mol %) and a weight average molecular weight of 0.6 million and (b) 1.00 part by weight of the water-soluble polymer 4 with respect to 100 parts by weight of the P3HB3HH.

[Production Example 5] Preparation of P3HA-5

P3HA-5 was prepared by the method described in International Publication No. WO 2018/070492. At this time, 1.00 part by weight of the water-soluble polymer 5 (Emulsogen EPN 073 manufactured by CLARIANT) was used, instead of the water-soluble polymer 1, with respect to 100 parts by weight of the P3HA. The resulting P3HA-5 contained (a) P3HB3HH having a monomer ratio of 3HB/

3HH=95/5 (mol %/mol %) and a weight average molecular weight of 0.6 million and (b) 1.00 part by weight of the water-soluble polymer 5 with respect to 100 parts by weight of the P3HB3HH.

[Production Example 6] Preparation of P3HA-6

P3HA-6 was prepared by the method described in International Publication No. WO 2018/070492. At this time, 0.05 parts by weight of water-soluble polymer 1 (Kuraray Poval PVA-205 manufactured by Kuraray Co., Ltd.) was used with respect to 100 parts by weight of P3HA. The resulting P3HA-6 contained (a) P3HB3HH having a monomer ratio of 3HB/3HH=95/5 (mol %/mol %) and a weight average molecular weight of 0.6 million and (b) 0.05 parts by weight of the water-soluble polymer 1 with respect to 100 parts by weight of the P3HB3HH.

[Production Example 7] Preparation of P3HA-7

P3HA-7 was prepared by fluidized bed drying instead of spray drying described in International Publication No. WO 2018/070492. At this time, no water-soluble polymer was used. The resulting P3HA-7 was P3HB3HH having a monomer ratio of 3HB/3HH=95/5 (mol %/mol %) and a weight average molecular weight of 0.6 million. The resulting P3HA-7 contained (a) P3HB3HH having a monomer ratio of 3HB/3HH=95/5 (mol %/mol %) and a weight average molecular weight of 0.6 million.

[Production Example 8] Preparation of P3HA-8

P3HA-8 was prepared by the method described in International Publication No. WO 2018/070492. At this time, 0.50 parts by weight of the water-soluble polymer 4 (Emulsogen EPN 287 manufactured by CLARIANT) was used, instead of the water-soluble polymer 1, with respect to 100 parts by weight of the P3HA. The resulting P3HA-8 contained (a) P3HB3HH having a monomer ratio of 3HB/3HH=89/11 (mol %/mol %) and a weight average molecular weight of 0.58 million and (b) 0.50 parts by weight of the water-soluble polymer 4 with respect to 100 parts by weight of the P3HB3HH.

The types and amounts of P3HA and water-soluble polymer used in each Production Example are summarized in Table 1.

Example 1

(Production of Poly(3-Hydroxyalkanoate)-Based Resin Particles)

P3HA-1 was used, weighing was carried out so that P3HA-1 was 100.0 parts by weight, a cell adjusting agent was 0.10 parts by weight, a crystal nucleating agent was 1.0 part by weight, the lubricant 1 was 0.10 parts by weight, and the lubricant 2 was 0.10 parts by weight, and a mixture was obtained with use of Supermixer (SMV (G)-100 manufactured by Kawata MFG Co., Ltd.). The mixture was melted and kneaded at a cylinder setting temperature of 130° C. to 160° C. with use of a twin screw extruder (TEM-26SX manufactured by Toshiba Machine Co., Ltd.) and discharged from a nozzle of a die attached to a tip of the extruder. After a melted P3HA-based composition of 180° C. discharged from the nozzle had been water-cooled at 43° C., a trace amount of a water-diluted antistatic agent was applied to a surface of a strand of the P3HA-based composition (100 parts by weight). After that, the strand was cut. Resulting poly(3-hydroxyalkanoate)-based resin particles weighed 2.0 mg per particle, had a length/diameter ratio of 1.5, had a temperature of 145° C., and had a melting end temperature of 152° C. In addition, the resin particles had an MFR of 2.2 g/10 min as measured at a measurement temperature of 160° C. and under a load of 5 kgf.

(Production of Poly(3-Hydroxyalkanoate)-Based Expanded Particles)

100 parts by weight of the resulting poly(3-hydroxyalkanoate)-based resin particles, 200 parts by weight of pure water, 1.0 part by weight of dispersing agent, 0.1 parts by weight of dispersing aid, and 2.0 parts by weight of cross-linking agent were inserted in a pressure-resistant vessel under stirring. After that, aeration with carbon dioxide was sufficiently carried out, so that oxygen in the pressure-resistant vessel was removed. Next, carbon dioxide was introduced as a blowing agent into the pressure-resistant vessel. After that, the temperature of a dispersion slurry in the pressure-resistant vessel was increased to an expansion temperature of 129.5° C. After that, additional carbon dioxide was introduced to increase the pressure to an expansion pressure of 3.3 MPa (gauge pressure), and a temperature around the expansion temperature and a pressure around the expansion pressure were held for 60 minutes. After that, a valve at the bottom of the pressure-resistant vessel was opened, and the dispersion slurry in the pressure-resistant vessel was released through an opening orifice of 3.6 mm in diameter under atmospheric pressure to obtain poly(3-hydroxyalkanoate)-based expanded particles. The dispersing agent adhering to the surfaces of the expanded particles was removed to some extent with a water-diluted cleaning agent and warm water, and drying was carried out at 80° C. At this time, a trace amount of water-diluted antistatic t was sprayed to the poly(3-hydroxyalkanoate)-based expanded particles to inhibit the electrostatics of the poly(3-hydroxyalkanoate)-based expanded particles. As the for resulting poly(3-hydroxyalkanoate)-based expanded particles, the expansion ratio was 21 times, the gel fraction was 69% by weight, the weight per particle was 2.0 mg, the length/diameter ratio was 0.9, and the cell diameter was 260 μm, and the closed cell ratio was 94%. The properties of poly(3-hydroxyalkanoate)-based expanded particles are summarized in Table 2 and Table 3.

(Production of Poly(3-Hydroxyalkanoate)-Based Foamed Molded Product)

The resulting poly(3-hydroxyalkanoate)-based expanded particles were inserted in a pressure-resistant vessel heated to 80° C., and the internal pressure of the poly(3-hydroxyalkanoate)-based expanded particles was set to 0.15 MPa (absolute pressure) by pressurization treatment with air. The expanded particles were filled into a mold measuring 370 mm long by 320 mm wide by 60 mm thick in a molding machine (EP-900L-M5 manufactured by DAISEN). Next, the poly(3-hydroxyalkanoate)-based expanded particles were heated for 5 seconds to 10 seconds by steam at a pressure of 0.15 MPa (gauge pressure) to obtain a poly(3-hydroxyalkanoate)-based poly(3-hydroxyalkanoate)-based foamed molded product. After that, the foamed molded product was dried at 75° C. The results of evaluation on poly(3-hydroxyalkanoate)-based foamed molded products are summarized in Table 2 and Table 3.

Examples 2 to 5 and Comparative Examples 1 to 3

Poly(3-hydroxyalkanoate)-based resin particles, poly(3-hydroxyalkanoate)-based expanded particles, and poly(3-hydroxyalkanoate)-based foamed molded products were prepared as in Example 1 except that poly(3-hydroxyalkanoate)-based resin to be used and an aqueous polymer to be used were changed as shown in Table 2 and Table 3, and evaluation was carried out as in Example 1. The evaluation results are summarized in Table 2 and Table 3.

(2) In Comparative Example 1, the poly(3-hydroxyalkanoate)-based resin and the small amount of ionic water-soluble polymer were used to prepare the poly(3-hydroxyalkanoate)-based expanded particles. However, in this case, pyrolysis was promoted during melting and kneading in preparing the poly(3-hydroxyalkanoate)-based resin particles, and the MFR of the resin particles became very high. As a result, in Comparative Example 1, it was possible to increase the expansion ratio of the poly(3-hydroxyalkanoate)-based expanded particles. However, due to a low closed cell ratio of the poly(3-hydroxyalkanoate)-based expanded particles, it was not possible to obtain a good poly(3-hydroxyalkanoate)-based foamed molded product.

TABLE 1

| | | P3HA-1 | P3HA-2 | P3HA-3 | P3HA-4 | P3HA-5 | P3HA-6 | P3HA-7 | P3HA-8 |
|---|---|---|---|---|---|---|---|---|---|
| P3HA | | 100 | 100 | 100 | 100 | 100 | 100 | 100 | 100 |
| Water-soluble polymer | Type | Non-ionic | Non-ionic | Non-ionic | Non-ionic | Ionic | Non-ionic | — | Non-ionic |
| | Water-soluble polymer 1 | 1.00 | | | | | 0.05 | — | — |
| | Water-soluble polymer 2 | | 1.00 | 1.00 | | | | — | — |
| | Water-soluble polymer 3 | | | 0.50 | | | | — | — |
| | Water-soluble polymer 4 | | | | 1.00 | | | — | 0.50 |
| | Water-soluble polymer 5 | | | | | 1.00 | | — | — |

TABLE 2

| P3HA | Type | — | Example 1 P3HA-1 | Example 2 P3HA-2 | Example 3 P3HA-3 | Example 4 P3HA-4 | Example 5 P3HA-8 |
|---|---|---|---|---|---|---|---|
| Resin particles | MFR | g/10 min | 2.2 | 2.2 | 2.3 | 2.2 | 2.5 |
| Expansion conditions | Expansion temperature | °C | 129.5 | 129.5 | 129.5 | 129.5 | 114.5 |
| | Expansion pressure | MPa | 3.3 | 3.3 | 3.3 | 3.3 | 3.3 |
| Expanded particles | Apparent density | g/L | 57.1 | 60 | 57.1 | 63.2 | 67 |
| | Expansion ratio | Times | 21 | 20 | 21 | 19 | 18 |
| | High temperature-side heat quantity | J/g | 4.8 | 5.0 | 4.5 | 4.9 | 5.3 |
| | Cell diameter | μm | 260 | 252 | 262 | 245 | 221 |
| | Gel fraction | % by weight | 69 | 68 | 71 | 70 | 68 |
| | Closed cell ratio | % | 94 | 95 | 94 | 97 | 97 |
| Molding conditions | Internal pressure of beads | MPa | 0.15 | 0.15 | 0.15 | 0.15 | 0.15 |
| | Molding pressure | MPa | 0.12 | 0.12 | 0.12 | 0.12 | 0.10 |
| Molded product | Expansion ratio | Times | 32 | 30 | 32 | 28 | 26 |

TABLE 3

| | | | Comparative Example 1 | Comparative Example 2 | Comparative Example 3 |
|---|---|---|---|---|---|
| P3HA | Type | — | P3HA-5 | P3HA-6 | P3HA-7 |
| Resin particles | MFR | g/10 min | 39.0 | 2.2 | 2.2 |
| Expansion conditions | Expansion temperature | °C | 130.5 | 129.5 | 129.5 |
| | Expansion pressure | MPa | 3.3 | 3.3 | 3.3 |
| Expanded particles | Apparent density | g/L | 50 | 70.6 | 70.6 |
| | Expansion ratio | Times | 24 | 17 | 17 |
| | High temperature-side heat quantity | J/g | 7.2 | 5.0 | 5.0 |
| | Cell diameter | μm | 151 | 183 | 183 |
| | Gel fraction | % by weight | 18 | 67 | 67 |
| | Closed cell ratio | % | 84 | 99 | 99 |
| Molding conditions | Internal pressure of beads | MPa | 0.15 | 0.15 | 0.15 |
| | Molding pressure | MPa | 0.12 | 0.12 | 0.12 |
| Molded product | Expansion ratio | Times | Not obtained | 24 | 24 |

Discussion

Tables 1 to 3 show the following:

(1) Examples 1 to 5 show that, in a case where a poly(3-hydroxyalkanoate)-based resin and a small amount of non-ionic water-soluble polymer are used to prepare poly(3-hydroxyalkanoate)-based expanded particles, poly (3-hydroxyalkanoate)-based expanded particles with a high expansion ratio are obtained by a single expansion treatment.

(3) In Comparative Example 2, the poly(3-hydroxyalkanoate)-based resin and the very small amount (0.05 by weight) of ionic water-soluble polymer were used to prepare the poly(3-hydroxyalkanoate)-based expanded particles. However, in this case, it was not possible to increase the expansion of ratio the poly(3-hydroxyalkanoate)-based expanded particles.

(4) In Comparative Example 3, no water-soluble polymer was used to prepare the poly(3-hydroxyalkanoate)-based expanded particles. In this case, it was not possible to increase the expansion ratio of the poly(3-hydroxyalkanoate)-based expanded particles.

INDUSTRIAL APPLICABILITY

The present invention is suitably applicable in the fields including: cushioning materials for packaging (for example, including: cushioning materials for packaging household electric appliances such as refrigerators, freezers, air conditioner bodies, outdoor units of air conditioner bodies, washing machines, air purifiers, humidifiers, rice cookers, microwave ovens, ovens, toasters, electric fans, and units for storage batteries; and cushioning materials for packaging automotive parts such as transmissions, roofs, hoods, doors, batteries, and engines); automotive components (for example, including bumper core materials, headrests, luggage boxes, tool boxes, floor spacers, seat core materials, child seat core materials, sun visor core materials, and kneepads); heat insulating materials (for example, including containers for constant-temperature storage and containers for constant-temperature transport); casting pattern applications; produce boxes; fish boxes; building materials; and civil engineering materials.

The invention claimed is:

1. Poly(3-hydroxyalkanoate)-based expanded particles comprising:

a poly(3-hydroxyalkanoate)-based resin (A); and a non-ionic water-soluble polymer (B), said poly(3-hydroxyalkanoate)-based expanded particles containing the non-ionic water-soluble polymer (B) in an amount of 0.10 parts by weight to 5.00 parts by weight with respect to 100 parts by weight of the poly(3-hydroxyalkanoate)-based resin (A), the poly(3-hydroxyalkanoate)-based expanded particles having a closed cell ratio of not less than 90%.

2. The poly(3-hydroxyalkanoate)-based expanded particles according to claim 1, wherein the non-ionic water-soluble polymer (B) has a hydrophobic group.

3. The poly(3-hydroxyalkanoate)-based expanded particles according to claim 1, wherein the non-ionic water-soluble polymer (B) is biodegradable.

4. The poly(3-hydroxyalkanoate)-based expanded particles according to claim 1, wherein the non-ionic water-soluble polymer (B) is at least one selected from the group consisting of polyalkylene oxide, polyvinyl alcohol, and a cellulose derivative.

5. The poly(3-hydroxyalkanoate)-based expanded particles according to claim 4, wherein the poly(3-hydroxyalkanoate)-based expanded particles contains the non-ionic water-soluble polymer (B) in an amount of 0.10 parts by weight to 1.00 part by weight with respect to 100 parts by weight of the poly(3-hydroxyalkanoate)-based resin (A).

6. The poly(3-hydroxyalkanoate)-based expanded particles according to claim 1, wherein the poly(3-hydroxyalkanoate)-based resin (A) is at least one selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

7. The poly(3-hydroxyalkanoate)-based expanded particles according to claim 1, wherein the poly(3-hydroxyalkanoate)-based resin (A) is a copolymer having a 3-hydroxybutyrate unit and a comonomer unit, and a ratio of the 3HB unit to the comonomer unit (the 3HB unit/the comonomer unit) in 100 mol % of all repeating units in the copolymer is 99/1 (mol %/mol %) to 85/15 (mol %/mol %).

8. The poly(3-hydroxyalkanoate)-based expanded particles according to claim 1, wherein the poly(3-hydroxyalkanoate)-based expanded particles have an apparent density of 20 g/L to 67 g/L.

9. The poly(3-hydroxyalkanoate)-based expanded particles according to claim 1, wherein the poly(3-hydroxyalkanoate)-based expanded particles have a high temperature-side heat quantity of 0.1 J/g to 20.0 J/g.

10. The poly(3-hydroxyalkanoate)-based expanded particles according to claim 1, wherein the poly(3-hydroxyalkanoate)-based expanded particles have a cell diameter of 50 μm to 500 μm.

11. The poly(3-hydroxyalkanoate)-based expanded particles according to claim 1, wherein the poly(3-hydroxyalkanoate)-based expanded particles have a gel fraction of not less than 30% by weight.

12. A poly(3-hydroxyalkanoate)-based foamed molded product comprising the poly(3-hydroxyalkanoate)-based expanded particles according to claim 1.

13. The poly(3-hydroxyalkanoate)-based foamed molded product according to claim 12, wherein the poly(3-hydroxyalkanoate)-based foamed molded product has an expansion ratio of not less than 25 times.

* * * * *